US009684147B2

United States Patent
Koiwai et al.

(10) Patent No.: US 9,684,147 B2
(45) Date of Patent: Jun. 20, 2017

(54) CHANGEABLE LENS BARREL

(71) Applicant: Olympus Corporation, Hachioji, Tokyo (JP)

(72) Inventors: Tamotsu Koiwai, Akiruno (JP); Shigeo Hayashi, Okaya (JP); Naohiro Kageyama, Musashino (JP); Mitsuru Toyama, Hidaka (JP)

(73) Assignee: Olympus Corporation, Tokyo (JP)

( * ) Notice: Subject to any disclaimer, the term of this patent is extended or adjusted under 35 U.S.C. 154(b) by 128 days.

(21) Appl. No.: 14/808,209

(22) Filed: Jul. 24, 2015

(65) Prior Publication Data

US 2015/0331221 A1 Nov. 19, 2015

Related U.S. Application Data

(63) Continuation of application No. PCT/JP2014/051241, filed on Jan. 22, 2014.

(30) Foreign Application Priority Data

Jan. 25, 2013 (JP) ................................. 2013-012435
Jan. 7, 2014 (JP) ................................. 2014-001134

(51) Int. Cl.
*G02B 15/14* (2006.01)
*G02B 7/10* (2006.01)
*G03B 17/14* (2006.01)

(52) U.S. Cl.
CPC ............... *G02B 7/10* (2013.01); *G02B 7/102* (2013.01); *G03B 17/14* (2013.01)

(58) Field of Classification Search
CPC ...................................................... G02B 7/10

(Continued)

(56) References Cited

U.S. PATENT DOCUMENTS 8,730,596 B2 * 5/2014 Ota ....................... G03B 17/14
                                                                    359/817
2006/0007564 A1   1/2006 Sakamoto et al.

FOREIGN PATENT DOCUMENTS

JP        50-065224        6/1975
JP        02-025815        1/1990
                (Continued)

OTHER PUBLICATIONS

International Search Report to International Application No. PCT/JP2014/051241, mailed on Apr. 1, 2014 (2 pgs.), with translation (1 pg.).

(Continued)

*Primary Examiner* — James Jones
(74) *Attorney, Agent, or Firm* — John C. Pokotylo; Straub & Pokotylo

(57) ABSTRACT

A changeable lens barrel includes a fixed barrel formed in an annular shape a straight-advancing barrel housed in the fixed barrel during non-photographing and extended to an outside of the fixed barrel during photographing, and a first annular member that turns according to manual operation. When the changeable lens barrel is in a photographable state, a part of an outer circumference of the first annular member is exposed to an outside and a front end face of the annular member forward in an optical axis direction is located further forward than a front end face of the fixed barrel, and, when the changeable lens barrel is in an un-photographable state, a rear end face backward in the optical axis direction is within the fixed barrel and the rear end face is present further backward in the optical axis direction than when the changeable lens barrel is in the photographable state.

16 Claims, 20 Drawing Sheets

(58) Field of Classification Search
USPC .................................................. 359/701, 817
See application file for complete search history.

(56) References Cited

FOREIGN PATENT DOCUMENTS

| | | |
|---|---|---|
| JP | 10-020176 | 1/1998 |
| JP | 2001-194572 | 7/2001 |
| JP | 2001-242542 | 9/2001 |
| JP | 2004-085835 | 3/2004 |
| JP | 2010-286789 | 12/2010 |

OTHER PUBLICATIONS

Supplementary European Search Report to European Application No. 14743857, mailed on Nov. 26, 2015 (9 pgs.).

* cited by examiner

CHANGEABLE LENS BARREL

CROSS REFERENCE TO RELATED APPLICATION

This application is a continuation application of PCT/JP2014/051241 filed on Jan. 22, 2014 and claims benefit of Japanese Applications No. 2013-012435 filed in Japan on Jan. 25, 2013 and No. 2014-001134 filed in Japan on Jan. 7, 2014, the entire contents of each of which are incorporated herein by their reference.

BACKGROUND OF THE INVENTION

1. Field of the Invention

The present invention relates to a changeable lens barrel of a form that changes to a more retracted state during non-photographing than during photographing and changes to a more extended state during the photographing than during the non-photographing.

2. Description of the Related Art

A lens barrel applied to a photographing apparatus such as a camera has been configured by various members such as a photographing optical system including a plurality of optical lenses, a plurality of lens barrel members for holding the photographing optical system and moving the photographing optical system in an optical axis direction, a driving member and the like that drive a part of the plurality of lens barrel members, and a diaphragm mechanism.

In such a lens barrel, a zoom lens barrel including a photographing optical system configured to be variable in magnification to enable a continuous change of a focal length is widely spread. In the zoom lens barrel, the photographing optical system is configured using a large number of optical lenses in order to configure the zoom lens barrel to be variable in magnification. Therefore, a dimension in the optical axis direction in a use state tends to increase. That is, the zoom lens barrel normally changes to an extended state when set in a photographable use state and is configured be telescopic according to zoom operation at this point.

Therefore, in the zoom lens barrel in the past, in order to improve portability during non-photographing (during non-use) when photographing is not performed, various zoom lens barrels of a so-called collapsible type configured to be capable of setting an entire length in an optical axis O direction in a shorter state (a collapsed state) than in an extended state during use have been proposed by, for example, Japanese Patent Application Laid-Open Publication No. 2010-286789 and have been generally put to practical use.

The zoom lens barrels of the collapsible type disclosed in Japanese Patent Application Laid-Open Publication No. 2010-286789 and the like are configured in a three-stage extendable type and configured such that both of a zoom operation ring and a focus operation ring are exposed to a barrel outermost portion when the zoom lens barrels axe changed to the collapsed state.

In recent years, in photographing apparatuses such as a camera (e.g., a digital camera and a video camera), a photographing apparatus equipped with a zoom lens barrel including an optical zoom function is spread to public. The zoom lens barrel of this type has an advantage that it is possible to easily enjoy a change in an angle of view of an image that can be photographed by a continuous magnification function. On the other hand, since a photographing optical system is configured by a group of a plurality of optical lenses, an entire length in a direction along an optical axis tends to be large.

In the photographing apparatuses such as the camera in the past, a reduction in a size of the apparatuses is always demanded in order to improve portability. For example, in the photographing apparatuses in the past, various zoom lens barrels including a so-called collapsible mechanism of a form including a mechanism that changes to a more retracted state during non-photographing than during photographing and configured to change to a more extended state during the photographing than during the non-photographing have been proposed by Japanese Patent Application Laid-Open Publication No. 2-25815 and the like and have been generally put to practical use. By applying such zoom lens barrels including the collapsible mechanism, it is possible to realize a reduction in thickness in an optical axis direction of photographing apparatuses such as a camera during the non-photographing, that is, during carrying. Therefore, it is possible to improve portability of the photographing apparatuses such as a camera.

On the other hand, in the photographing apparatuses such as the camera in the past, various proposals have also been made concerning a photographing apparatus of a so-called lens replaceable type configured to enable, by configuring a lens barrel to be detachably attachable to a camera main body, a user to select a desired lens barrel from a plurality of kinds of lens barrels, replace the lens barrel with the desired lens barrel as appropriate, and use the desired lens barrel and a replaceable type zoom lens barrel applied to the photographing apparatus and have been generally put to practical use.

As the replaceable type zoom lens barrel in the past adopting the collapsible type, there is a zoom lens barrel of a form in which, when the zoom lens barrel is changed to a collapsed state, annular operation members such as a zoom ring and a distance ring are disposed on a fixed portion exposed to an outside. In the case of this form, the operation members such as the zoom ring and the distance ring are set in a state in which the operation members do not move in an optical axis direction with respect to the fixed portion and to be turnable around the optical axis.

In a replaceable zoom lens barrel and the like disclosed by, for example, Japanese Patent Application Laid-Open Publication No. 10-20176, the replaceable zoom lens barrel and the like are configured such that rotation resistance of a zoom ring is larger in a collapsing operation region than in a zoom operation region and is configured such that a rotation operation force in the collapsing operation region is larger than a rotation operation force during attachment and detachment of the zoom lens barrel to and from a camera main body. With this configuration, only the annular operation members do not rotate when the zoom lens barrel is attached to and detached from the camera main body. The zoom lens barrel can have operability and attaching and detaching properties.

The present invention provides an optical apparatus in which, in a lens barrel fixed to the optical apparatus or the like, while adopting a collapsible mechanism that changes to a more retracted state during non-photographing than during photographing and changes to a more extended state during the photographing than during the non-photographing, the lens barrel with the entire apparatus reduced in a size when the lens barrel is changed to a non-photographing state (a collapsed state) is fixed and provide a replaceable lens barrel configured not to hinder attaching and detaching properties and to be capable of securing satisfactory operability during the photographing even if the replaceable lens barrel is reduced in a size to be capable of being retracted in length in a replaceable lens barrel.

SUMMARY OF THE INVENTION

A changeable lens barrel in an aspect of the present invention includes: a fixed barrel formed in an annular shape and having length in an optical axis direction; a straight-advancing barrel relatively moving in the optical axis direction with respect to the annular fixed barrel and housed in the fixed barrel in a non-photographing state and extended to an outside of the fixed barrel in a photographing state; and a first annular member placed in the straight-advancing barrel, having length in the optical axis direction, and made of an annular member that turns around the optical axis according to manual operation. When the changeable lens barrel is in a photographable state, at least a part of an outer circumference of an exterior of the first annular member is exposed to an outside and a front end face of the annular member forward in an optical axis direction is located further forward than a front end face of the fixed barrel forward in the optical axis direction. When the changeable lens barrel is in an un-photographable state in which the changeable lens barrel is further retracted in the optical axis direction than in the photographing state, a rear end face backward in the optical axis direction is within the fixed barrel and the rear end face is present further backward in the optical axis direction than when the lens changeable barrel is in the photographable state.

DETAILED DESCRIPTION OF THE PREFERRED EMBODIMENT

Figure 1:
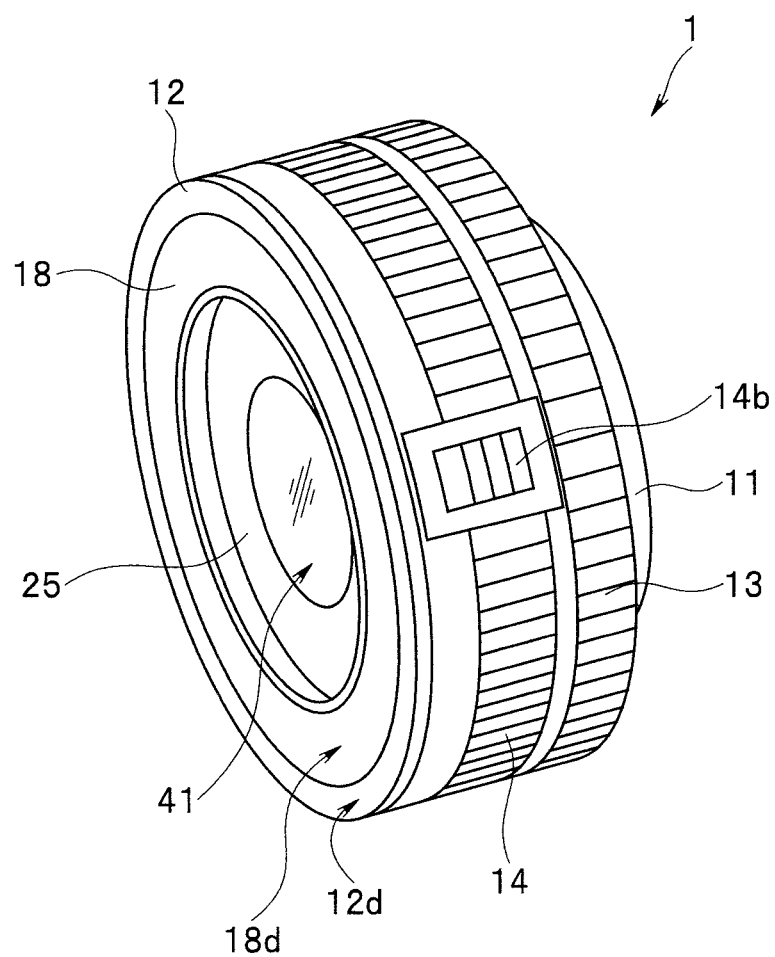
FIG. 1 is an external perspective view of a zoom lens barrel in an embodiment of the present invention changed to a collapsed state.

The present invention is explained below according to embodiments shown in the drawings.

First Embodiment

Figure 2:
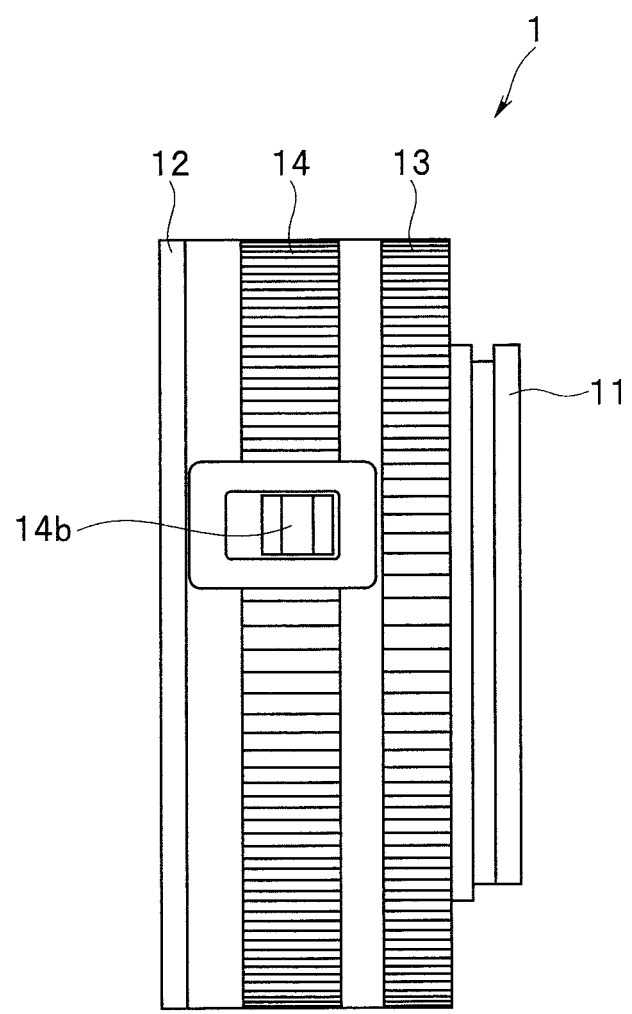
FIG. 2 is an external side view of the zoom lens barrel in the state shown in FIG. 1.
Figure 3:
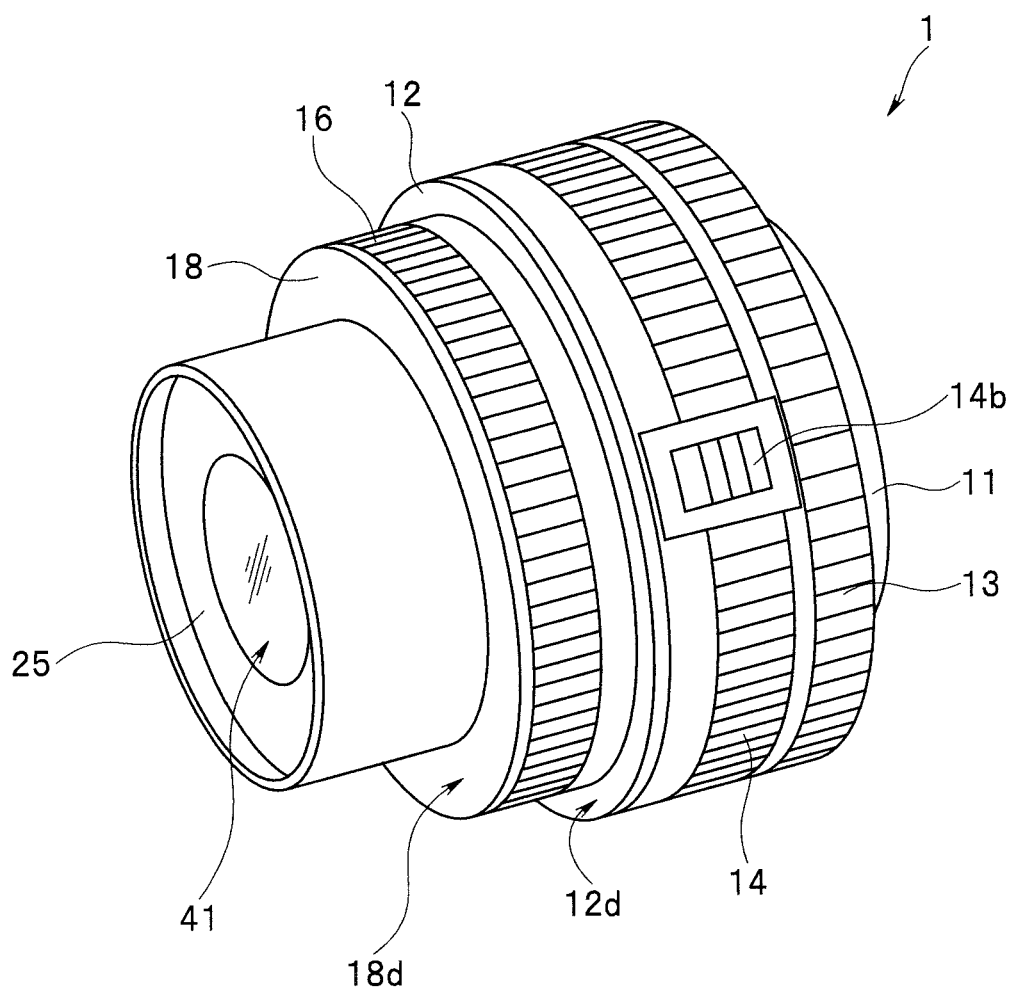
FIG. 3 is an external perspective view of the zoom lens barrel shown in FIG. 1 changed to a use state.
Figure 4:
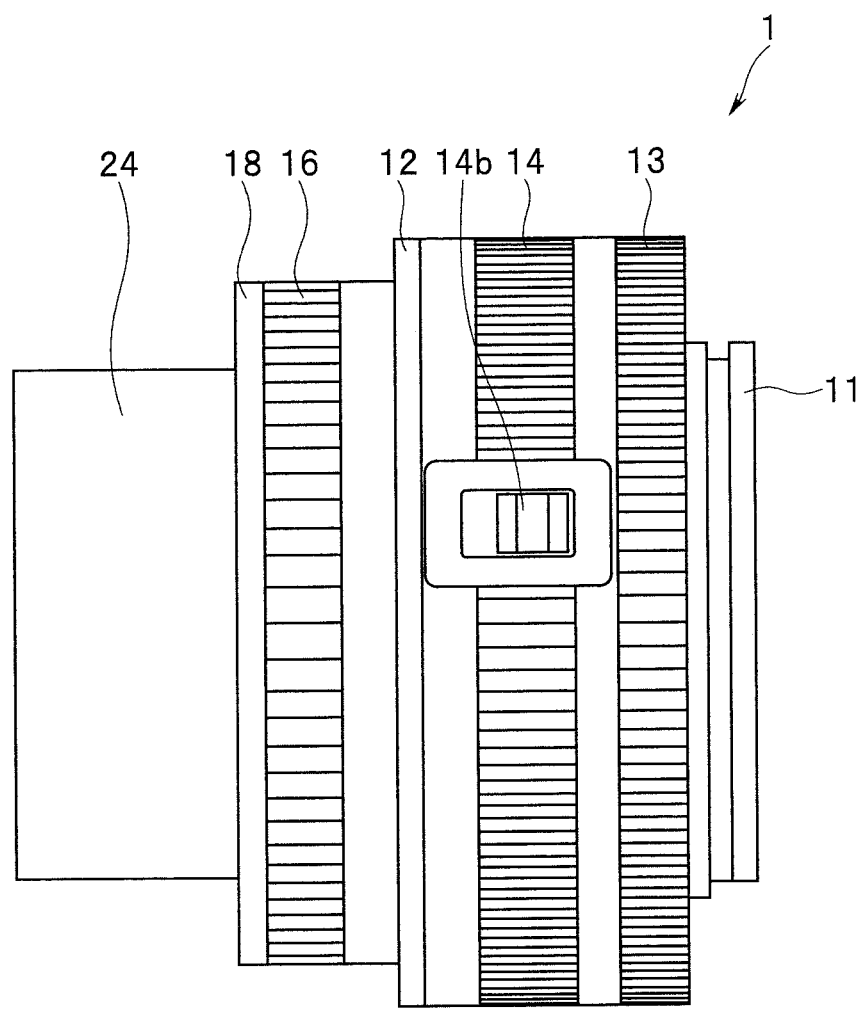
FIG. 4 is an external side view of the zoom lens barrel in the state shown in FIG. 3.
Figure 5:
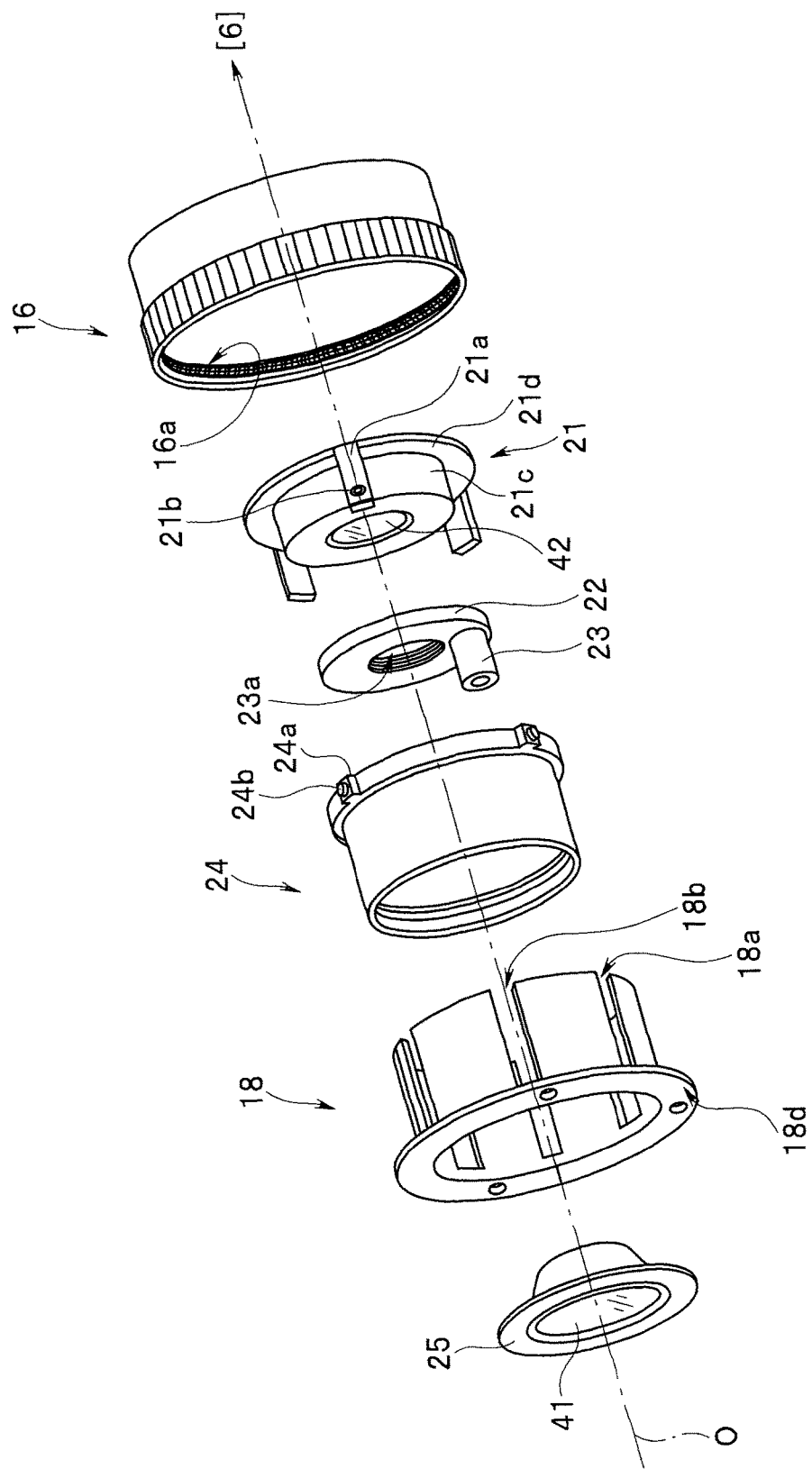
FIG. 5 is an exploded perspective view showing a configuration of a front half portion in the zoom lens barrel shown in FIG. 1.
Figure 6:
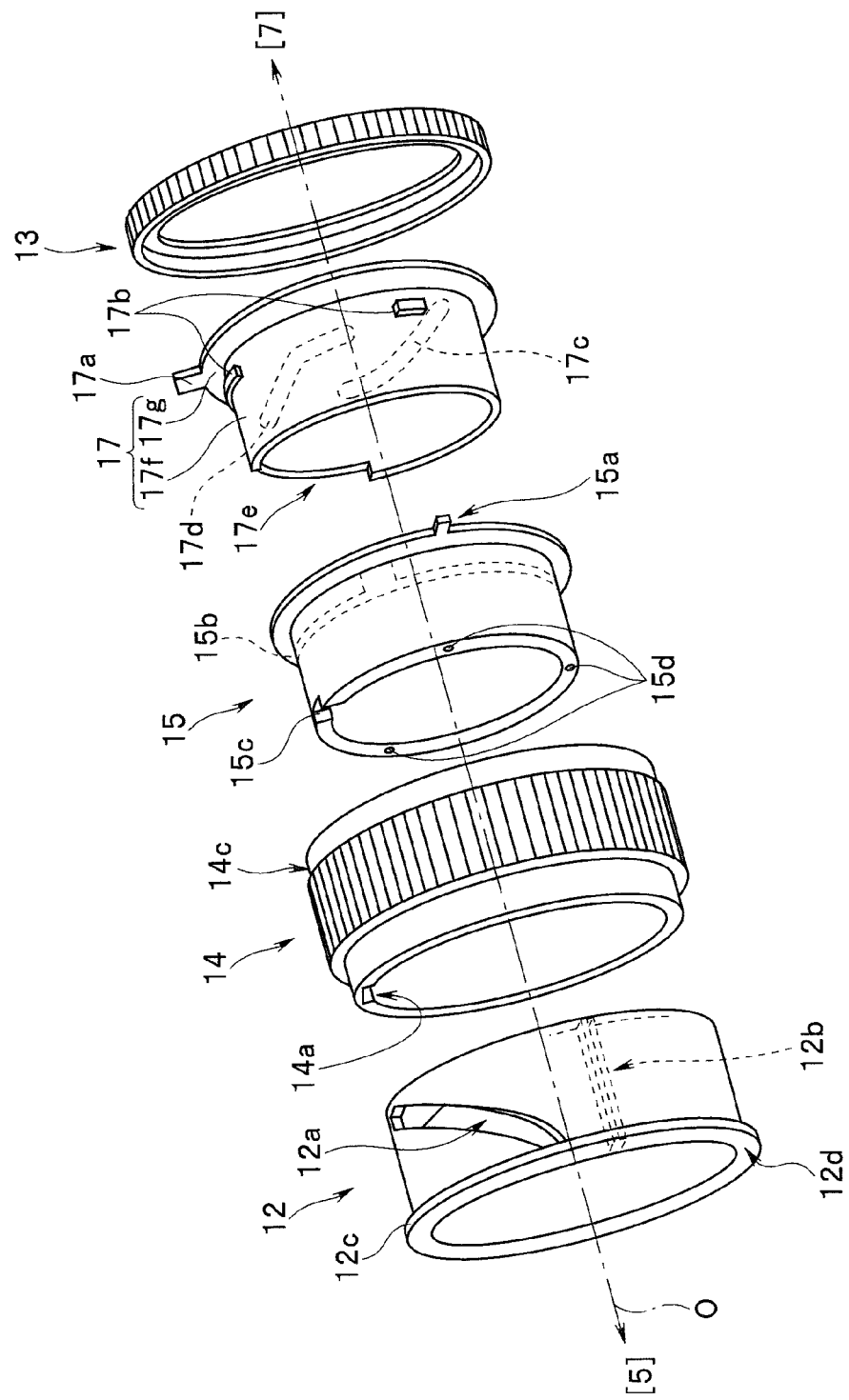
FIG. 6 is an exploded perspective view showing a configuration of a rear half portion in the zoom lens barrel shown in FIG. 1.
Figure 7:
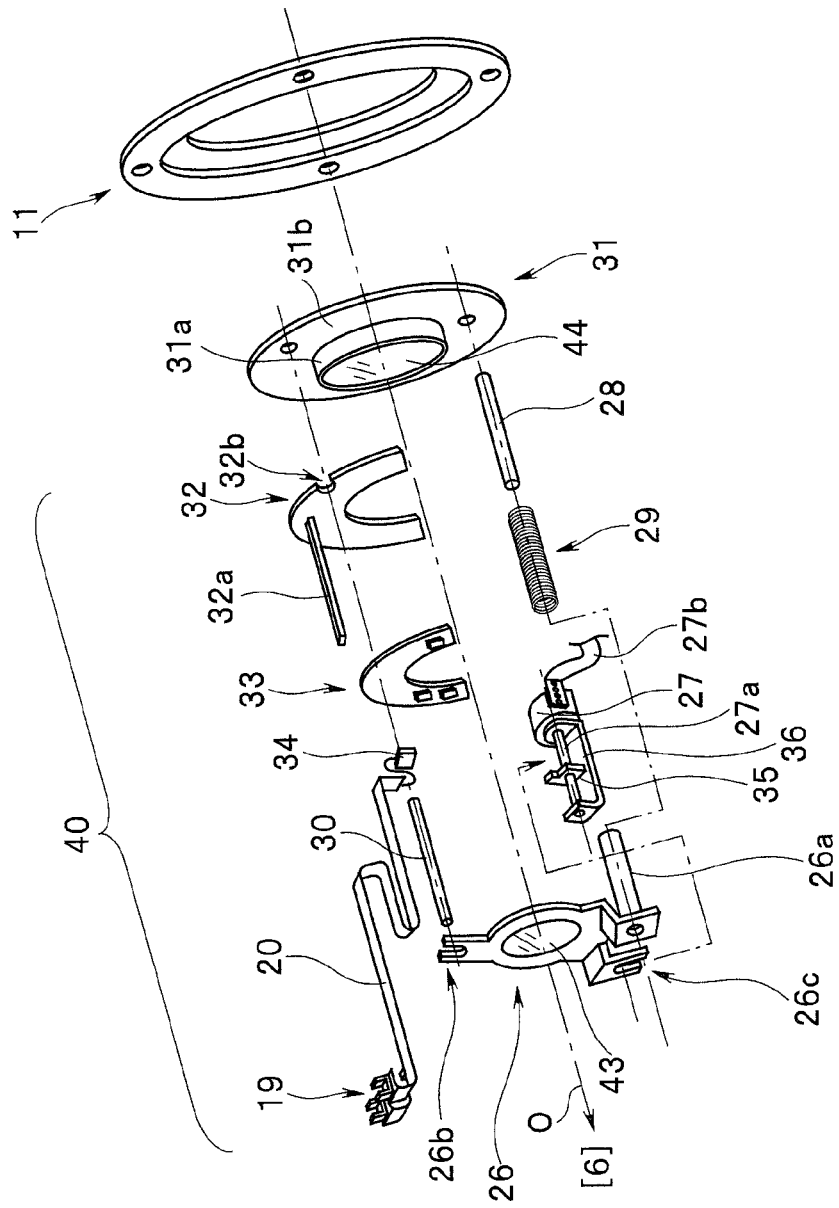
FIG. 7 is a main part exploded perspective view of a focus driving unit in the zoom lens barrel shown in FIG. 1.
Figure 8:
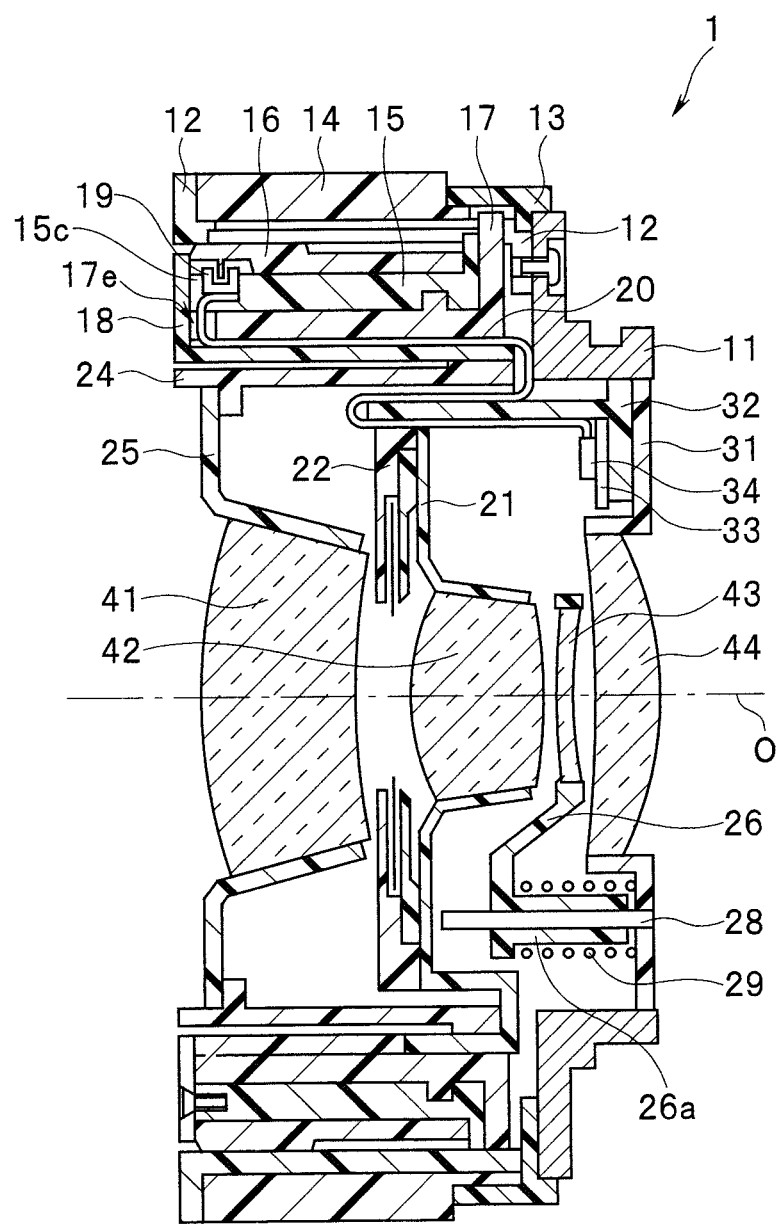
FIG. 8 is a side sectional view cut on a surface along an optical axis of the zoom lens barrel in the state (the collapsed state) shown in FIG. 1.
Figure 9:
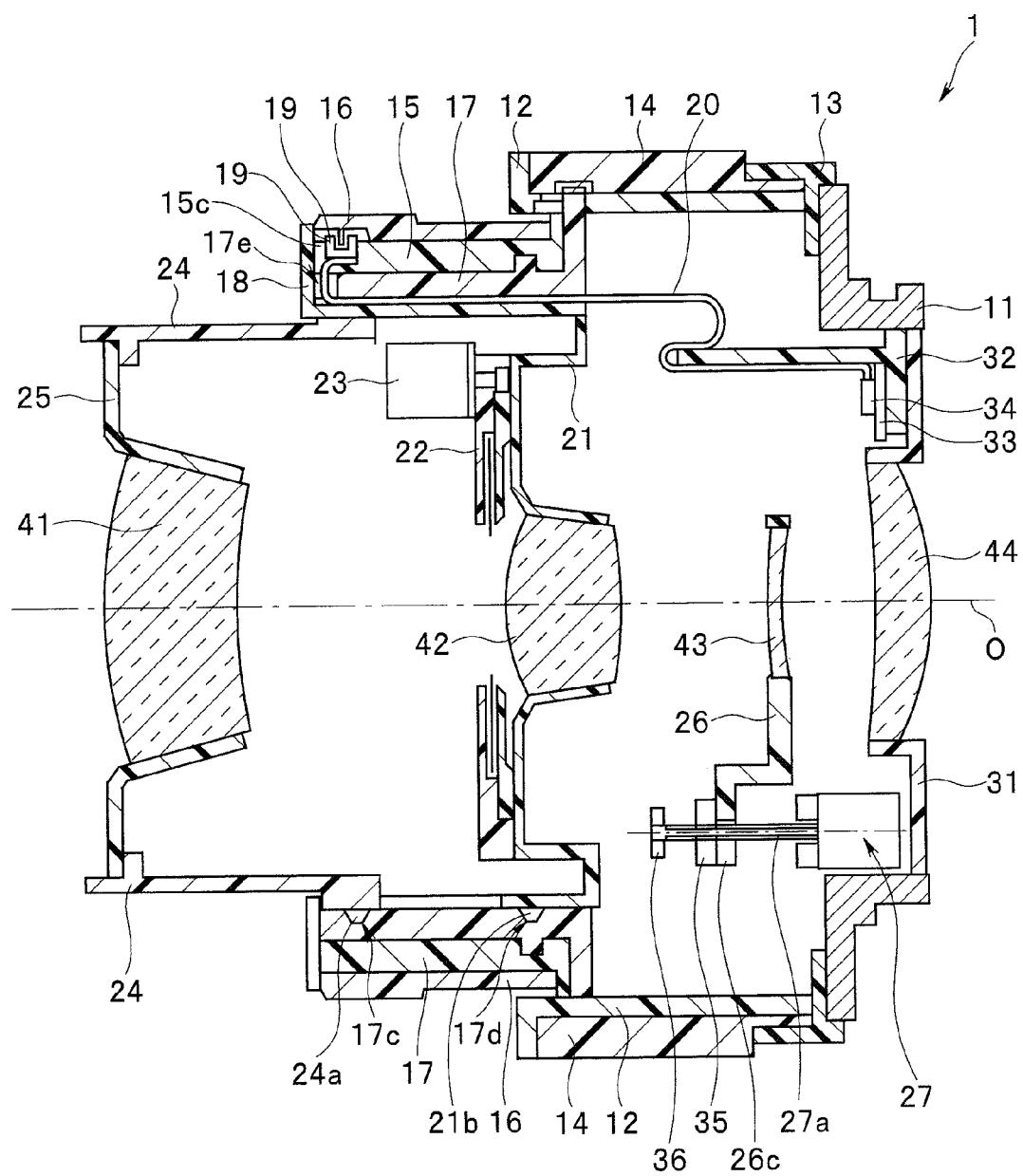
FIG. 9 is a side sectional view cut on the surface along the optical axis of the zoom lens barrel in the state (the use state) shown in FIG. 1.
Figure 10:
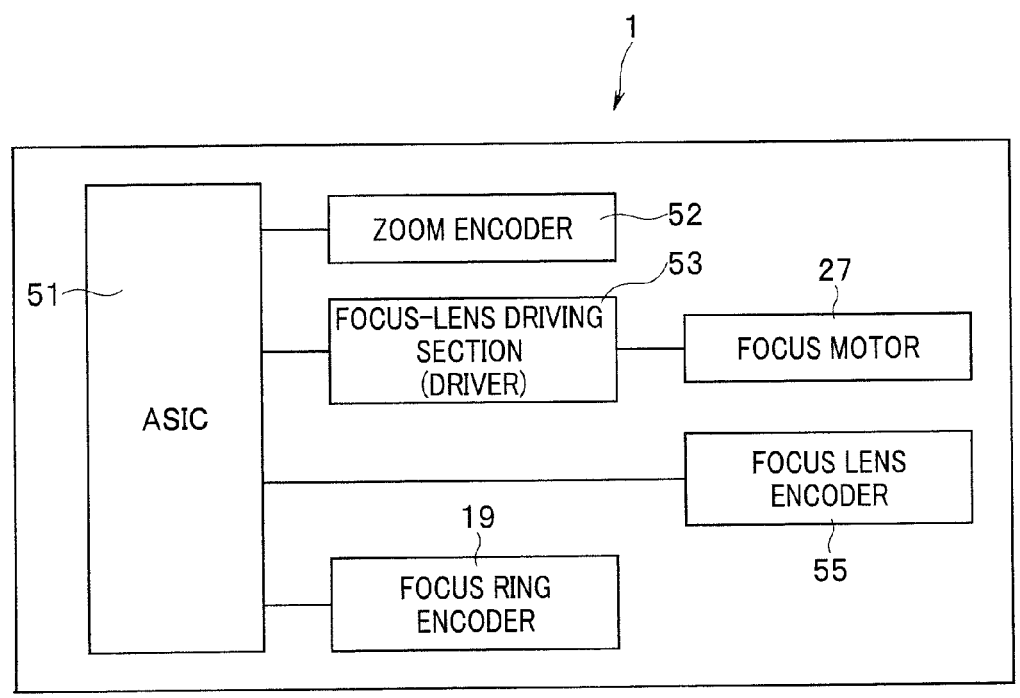
FIG. 10 is a block configuration diagram showing a schematic configuration of an electric circuit section in the zoom lens barrel shown in FIG. 1.

FIG. 1 to FIG. 10 are diagrams showing a zoom lens barrel in a first embodiment of the present invention. Among the figures, FIG. 1 is an external perspective view of the zoom lens barrel in the present embodiment changed to a collapsed state. FIG. 2 is an external side view of the zoom lens barrel in the state shown in FIG. 1. FIG. 3 is an external perspective view of the zoom lens barrel in the present embodiment changed to a use state. FIG. 4 is an external side view of the zoom lens barrel in the state shown in FIG. 3. FIG. 5 to FIG. 7 are exploded perspective views of the zoom lens barrel in the present embodiment. Among the figures, FIG. 5 shows a configuration of a front half portion of the zoom lens barrel in the present embodiment. FIG. 6 shows a configuration of a rear half portion of the zoom lens barrel in the present embodiment. FIG. 7 is a main part exploded perspective view of a focus driving unit in the zoom lens barrel in the present embodiment. FIG. 8 and FIG. 9 are side sectional views cut on a surface along an optical axis of the zoom lens barrel in the present embodiment. Of the figures, FIG. 8 is a side sectional view of the zoom lens barrel in the present embodiment in the collapsed state. FIG. 9 is a side sectional view of the zoom lens barrel in the present embodiment in the use state. FIG. 10 is a block configuration diagram showing a schematic configuration of an electric circuit section of the zoom lens barrel in the present embodiment.

The zoom lens barrel in the present embodiment is a zoom lens barrel functioning as a replaceable lens applied to a camera, which is a photographing apparatus of a so-called lens replaceable type configured to be detachably attachable to a camera body.

Note that, in the present embodiment, an optical axis of a photographing optical system of the zoom lens barrel is represented by a sign O. In a direction along the optical axis O, a side on which an object opposed to a front surface of the zoom lens barrel is present is referred to as front and a side on which a connecting section (a lens mount section) to the camera body disposed on a rear side of the zoom lens barrel is present is referred to as back.

In the respective drawings used for the following explanation, scales are sometimes varied for each of constituent elements in order to show the respective constituent elements in sizes of degrees recognizable on the drawings. Therefore, the present invention is not limited to only forms shown in the figures concerning quantities of the constituent elements described in the drawings, shapes of the constituent elements, ratios of sizes of the constituent elements, and relative positional relations among the respective constituent elements.

A zoom lens barrel 1 in the present embodiment is configured to be capable of extending and retracting in a direction along the optical axis O between the collapsed state shown in FIG. 1, FIG. 2, and FIG. 8 and the use state shown in FIG. 3, FIG. 4, and FIG. 9. That is, the zoom lens barrel 1 is configured to be displaceable between a retracted state, which is the collapsed state, during non-photographing and an extended state, which is a photographable use state and further extended than the collapsed state (the retracted state). Further, for magnification operation of a photographing optical system, the zoom lens barrel 1 is configured by combining a plurality of cylindrical members and the like to be capable of extending and retracting in a predetermined range in the use state.

For example, when a photographing apparatus (not shown in the figure; hereinafter referred to as camera) mounted with the zoom lens barrel 1 in the present embodiment is not used, for example, the photographing apparatus is carried, the zoom lens barrel 1 is changed to the collapsed state, which is a most retracted state. When the zoom lens barrel 1 in the present embodiment is changed to the collapsed state, as shown in FIG. 1, FIG. 2, and FIG. 8, a zoom ring 14, which is a focal-length-change operation member (a focal-length changing ring, a second annular member), turnably held on an outer circumferential surface of an annular fixed barrel 12 is disposed on an outermost circumference side. A focus ring (a distance ring, a first annular member) 16, which is a focal-position adjusting member, turnably held on an outer circumferential surface of a moving barrel 15 is internally inserted and disposed on an inner circumference side of the fixed barrel 12. Further, a zoom barrel 24 and the like that hold a first group barrel 25 on an inner side via a cam ring 17 and a straight-advancing barrel 18 are internally inserted and disposed on the inner circumference side of the moving barrel 15. In this case, a dimension in a direction along the optical axis O is a shortest dimension of the zoom lens barrel 1.

That is, in this collapsed state, as shown in FIG. 1 and FIG. 2, the zoom ring 14 on the outermost circumference side, a rear cover 13 disposed behind the zoom ring 14 and covering a part closer to a rear end of the fixed barrel 12, and a lens mount section 11 disposed on a rearmost end face of the zoom lens barrel 1 and functioning as a connecting section to the camera body (not shown in the figure) are exposed to an outer side surface. Therefore, a reduced length in the optical axis O direction in the collapsed state of the zoom lens barrel 1 depends mainly on respective width dimensions in the optical axis O direction of the zoom ring 14, the rear cover 13, and the lens mount section 11.

Note that, as shown in FIG. 1 and FIG. 2, a stopper release button 14b is disposed in a region in a part of the zoom ring 14. In the zoom lens barrel 1, the zoom ring 14 is operated for the magnification operation when the zoom lens barrel 1 is in the use state. A stopper mechanism for preventing the zoom lens barrel 1 from being carelessly rotated and displaced from the use state to the collapsed state when the zoom ring 14 is operated is provided. The stopper release button 14b is an operation member for releasing the stopper mechanism by being operated when the zoom lens barrel 1 is displaced from the use state to the collapsed state with an intention of an operator. Note that, since the stopper mechanism is a portion not directly related to the present invention, detailed explanation and illustration of the stopper mechanism are omitted assuming that a stopper mechanism having a configuration generally put to practical used in the past is applied.

When the zoom lens barrel 1 in the present embodiment is displaced from the collapsed state to the use state, as shown in FIG. 3, FIG. 4, and FIG. 9, the fixed barrel 12, the zoom ring 14, and the like on the outermost circumference side are in an immovable state. The moving barrel 15, the focus ring 16, the cam ring 17, the straight-advancing barrel 18, and the like on an inner circumference side of the fixed barrel 12, the zoom ring 14, and the like relatively move forward with respect to the fixed barrel 12. The zoom barrel 24 and the like further on the inner circumference side of the moving barrel 15, the focus ring 16, the cam ring 17, the straight-advancing barrel 18, and the like are further extended forward than the focus ring 16 and the like.

Note that the state shown in FIG. 3, FIG. 4, and FIG. 9 is a state in which a focal length is set to a widest angle side (a short focal length) among focal lengths that can be set by the zoom lens barrel 1 (this state is hereinafter referred to as wide angle state) in the use state of the zoom lens barrel 1. In the zoom lens barrel 1, the displacement from the collapsed state shown in FIG. 1, FIG. 2, and FIG. 8 to the wide angle state and the magnification operation performed in the photographable use state are performed by turning operation of the zoom ring 14. That is, the zoom ring 14 (the focal-length changing ring) is rotatably provided on an outer circumference side of the fixed barrel 12 and configured to be capable of receiving the magnification operation and capable of receiving the displacement operation between the photographable use state (an extended state) and a retracted state, which is the collapsed state during the non-photographing (during the non-use).

When the zoom lens barrel 1 is in the wide angle state, if the zoom ring 14 is further turned, a part of the respective cylindrical members and the like are driven in association with the turning operation of the zoom ring 14. Other parts of the cylindrical members and the like move in the optical axis O direction according to the driving. According to such a series of operation, a focal length of the photographing optical system in the zoom lens barrel 1 can be continuously changed. A state in which the focal length is set to a most telephoto side (a long focal length) among the focal lengths that can be set by the zoom lens barrel 1 is referred to as telephoto state.

That is, when the zoom lens barrel 1 is in the use state, relative positional relations of respective lens groups configuring the photographing optical system are changed by performing the turning operation of the zoom ring 14. Consequently, it is possible to perform continuous displacement of the focal length between the wide angle state and the telephoto state.

In this way, in the zoom lens barrel 1, the displacement from the collapsed state shown in FIG. 1, FIG. 2, and FIG. 8 and the wide angle state shown in FIG. 3, FIG. 4, and FIG. 9 and the displacement in the use state, that is, the magnification operation between the wide angle state and the telephoto state are performed by the turning operation of the zoom ring 14.

Next, the respective constituent members of the zoom lens barrel 1 in the present embodiment are explained in detail below mainly with reference to FIG. 5 to FIG. 7.

The photographing optical system of the zoom lens barrel 1 in the present embodiment is configured by four lens groups including a first group lens 41, a second group lens 42, a third group lens 43, and a fourth group lens 44. Among the lens groups, the first group lens 41, the second group lens 42, and the third group lens 43 are movable lens groups movable in the direction along the optical axis O. The fourth group lens 44 is a fixed lens group fixed to a fixed part of the zoom lens barrel 1.

The first group lens 41 is a movable lens group disposed in a most distal end part of the zoom lens barrel 1 as shown in FIG. 8 and FIG. 9. The first group lens 41 is held by a first group barrel 25. The first group barrel 25 is fixedly provided in a part closer to a distal end on an inside of the zoom barrel 24. The zoom barrel 24 is formed in a cylindrical shape as a whole as shown in FIG. 5. The zoom barrel 24 includes, at an outer circumference rear end portion of the cylindrical shape, a plurality of (in this example, three) Z barrel straight-advancing keys 24a protrudingly provided outward in the radial direction. In each of the respective Z barrel straight-advancing keys 24a, a Z barrel cam pin 24b is protrudingly provided outward in the radial direction.

The straight-advancing barrel 18 is disposed on an outer circumference side of the zoom barrel 24. The straight-advancing barrel 18 is formed in a substantially cylindrical shape including a brim-like flange section in a front end portion. A plurality of (in this example, three) first group straight-advancing grooves 18a and a plurality of (in this example, three) second group straight-advancing grooves 18b opened in the direction along the optical axis O and on a rear end side are formed on a cylindrical shape portion of the straight-advancing barrel 18. The respective Z barrel straight-advancing keys 24a of the zoom barrel 24 engage with the respective first group straight-advancing grooves 18a to be capable of sliding in the optical axis O direction. With this configuration, the zoom barrel 24 is allowed to only move to advance and retract in the optical axis O direction by the straight-advancing barrel 18 and restricted (prohibited) from turning around the optical axis O. Similarly, second group straight-advancing keys 21a of a second group barrel 21 explained below engage with the respective second group straight-advancing grooves 18b to be capable of sliding in the optical axis O direction. With this configuration, the second group barrel 21 is allowed to only move to advance and retract in the optical axis O direction by the straight-advancing barrel 18 and restricted (prohibited) from turning around the optical axis O. Note that, in a state in which the zoom lens barrel 1 is assembled, the flange section of the straight-advancing barrel 18 plays a role of a stopper that restricts (prohibits) movement of the focus ring 16 explained below from moving forward in the optical axis O direction and suppresses the focus ring 16 from coming off. The straight-advancing barrel 18 is fixed integrally with the moving barrel 15 explained later using, for example, a screw.

The second group lens 42 is a movable lens group disposed behind the first group lens 41 as shown in FIG. 8 and FIG. 9. The second group lens 42 is held by the second group barrel 21. The second group barrel 21 is formed to include, as shown in FIG. 5, a cylindrical lens holding section 21c that holds the second group lens 42 substantially in a center, a flange section 21d formed on a rear end side of the lens holding section 21c and having a diameter slightly larger than an outer circumferential diameter of the lens holding section 21c, a plurality of (in this example, three) second group straight-advancing keys 21a extended forward in parallel to the optical axis O from an outer circumference side of the flange section 21d, and second group cam pins 21b respectively protrudingly provided outward in a radial direction on an outer surface closer to distal ends of the respective second group straight-advancing keys 21a. The lens holding section 21c of the second group barrel 21 is disposed on an inner circumference side of the zoom barrel 24. The respective second group straight-advancing keys 21a are disposed on an outer circumference side of the zoom barrel 24. As explained above, the second group straight-advancing keys 21a engage with the respective second group straight-advancing grooves 18b of the straight-advancing barrel 18 to be capable of sliding in the optical axis O direction. Note that a diaphragm unit 22 (see FIG. 5 and FIG. 9) including an aperture motor 23 (see FIG. 5 and FIG. 9; not shown in FIG. 8) is fixedly provided to be integrated on a front surface side of the second group barrel 21. Although a detailed configuration of the diaphragm unit 22 is not explained, a diaphragm opening 23a is formed substantially in a center of the diaphragm unit 22. The diaphragm unit 22 includes diaphragm vanes that open and close the diaphragm opening 23a. The diaphragm opening 23a is formed in a position where light transmitted through the photographing optical system could pass. A center of the diaphragm opening 23a is set to substantially coincide with the optical axis O.

As shown in FIG. 8 and FIG. 9, the cam ring 17 is disposed on an outer circumference side of the straight-advancing barrel 18. The cam ring 17 is formed by, as shown in FIG. 6, a cylindrical section 17f formed in a substantially cylindrical shape or a substantially annular shape as a whole and a flange section 17g formed at a rear end edge portion of the cylindrical section 17f. A rotation key 17a having a shape projecting outward in the radial direction is formed in a part of an outer circumference of the flange section 17g. The rotation key 17a is engaged with a cam-ring rotation groove 12a of the fixed barrel 12 and a cam-ring coupling groove 14a of the zoom ring 14 explained below.

As shown in FIG. 6, in a vicinity of the flange section 17g closer to a rear end on an outer circumferential surface of the cam ring 17, a plurality of (three to four) bayonet claws 17b projecting outward in the radial direction on the outer circumferential surface and having length in a circumferential direction are formed at substantially equal intervals in the circumferential direction. The bayonet claws 17b are configured to engage with a bayonet groove 15b formed in an inner circumference of the moving barrel 15 explained below to integrate the cam ring 17 and the moving barrel 15 and enable the cam ring 17 and the moving barrel 15 to rotate relatively to each other.

As shown in FIG. 6, a plurality of (in this example, three) pairs of cam grooves (17c and 17d) are formed in a predetermined cam shape on an inner circumferential surface of the cam ring 17. Reference sign 17c denotes a first group cam groove and reference sign 17d denotes a second group cam groove. That is, the Z barrel cam pin 24b of the zoom barrel 24 fits in the first group cam groove 17c. The second group cam pin 21b of the second group barrel 21 fits in the second group cam groove 17d. Note that a shape of the respective cam grooves (17c and 17d) is set to be a shape necessary for moving each of lens groups (in this example, the first group lens 41 and the second group lens 42) related to zooming of a plurality of lens groups configuring the photographing optical system in the direction along the optical axis O for magnification operation. Therefore, since the shape of the respective cam grooves is a portion not directly related to the present invention, detailed explanation of the cam groove shape is omitted.

Note that, in a part of a distal end edge portion of the cam ring 17, a cutout for flexible printed board 17e for allowing a flexible printed board for position detection 20 of the focus ring 16 explained below is formed (see FIG. 6, FIG. 8, and FIG. 9).

As shown in FIG. 8 and FIG. 9, the cam ring 17 is internally inserted on an inner side of the moving barrel 15. As shown in FIG. 6, the moving barrel 15 is formed in a substantially cylindrical shape as a whole and formed to include a flange section at a rear end portion. A cutout recess 15c is formed in a part of a front end edge portion of the moving barrel 15. As shown in FIG. 8, FIG. 9, and the like, the cutout recess 15c is a part where a photointerrupter (PI) 19 (a distance-ring rotating position detection sensor; see FIG. 7) explained below is disposed. A straight-advancing key 15a having a shape projecting outward in the radial direction is formed in a part of the flange section. The straight-advancing key 15a engages with a moving-barrel straight-advancing groove 12b of the fixed barrel 12 explained below. With this configuration, the moving barrel 15 is allowed to only move to advance and retract in the optical axis O direction with respect to the fixed barrel 12 and restricted (prohibited) from turning around the optical axis O. The cam ring 17 is internally inserted from a rear end of the moving barrel 15. As explained above, the bayonet claws 17b of the cam ring 17 are engaged with the bayonet groove 15b, which is a circumferential groove of an inner circumference of the moving barrel 15. With this configuration, the cam ring 17 and the moving barrel 15 are bayonet-connected. The cam ring 17 and the moving barrel 15 are configured to be capable of turning relatively to each other and integrally move to advance and retract in the optical axis O direction.

Note that a screw lower hole 15d is provided at a front end of the moving barrel 15. The moving barrel 15 and the straight-advancing barrel 18 are integrally fixed by the screw lower hole 15d and a through-hole 18e provided in the flange of the straight-advancing barrel 18 using, for example, a not-shown screw. Therefore, like the moving barrel 15, the straight-advancing barrel 18 moves to advance and retract in the optical axis O direction without rotating around the optical axis O direction with respect to the fixed barrel 12.

The focus ring 16 is disposed on an outer circumference side of the moving barrel 15 to be capable of turning around the optical axis O. The focus ring 16 is formed in a substantially cylindrical shape or a substantially annular shape as a whole. Comb teeth for PI 16a are disposed over an entire circumference in the circumferential direction on a front end edge portion inner circumference side. The comb teeth for PI 16a function as detecting means for detecting a rotation amount, rotating speed, and a rotating direction of the focus ring 16 in association with the photointerrupter 19 (see FIG. 7). Note that, in a part of a region on an outer circumferential surface of the focus ring 16, surface machining treatment, for example, knurling suitable for the user to perform manual turning operation is applied over an entire circumference. That is, the part applied with the knurling is set as an operation region.

A constituent unit of a configuration including the cam ring 17, the moving barrel 15, and the focus ring 16 integrated as explained above is internally inserted and disposed from a back to a front of the fixed barrel 12. Note that the straight-advancing barrel 18 is internally inserted and disposed on an inner side of the constituent unit from the front (a constituent unit incorporating the first group barrel 25, the zoom barrel 24, the second group barrel 21 including the diaphragm unit 22, and the like is internally inserted on an inner side of the straight-advancing barrel 18).

In this way, the constituent unit disposed in a predetermined part in the fixed barrel 12 is supported to be capable of moving to advance and retract in the direction along the optical axis O with respect to the fixed barrel 12. As the zoom lens barrel 1 is displaced from the photographable use state (the extended state) to the collapsed state (the retracted state) during the non-photographing, the entire outer circumferential surface of the focus ring 16, which is the distance ring, is housed on an inside of the fixed barrel 12. In this case, the focus ring 16 is configured such that a front end face in the optical axis O direction of the focus ring (the distance ring) 16 (in the present embodiment, actually, a front end face 18d (see FIG. 1, FIG. 3, and FIG. 5) of the straight-advancing barrel 18) and a front end face 12d (see FIG. 1, FIG. 3, and FIG. 6) in the optical axis O direction of the fixed barrel 12 are a same plane. On the other hand, when the zoom lens barrel 1 is changed to the photographable use state (the extended state), the focus ring 16 is exposed to the outside. Consequently, the focus ring 16 can receive focus adjustment operation.

Note that, in the present embodiment, when the zoom lens barrel 1 is changed to the collapsed state, the entire outer circumferential surface of the focus ring 16 is housed on the inside of the fixed barrel 12. However, the present invention is not limited to this form. For example, when the zoom lens barrel 1 is changed to the collapsed state, at least a part in the optical axis O direction of the outer circumferential surface of the focus ring 16 only has to be housed in the inside of the fixed barrel 12.

As shown in FIG. 8 and FIG. 9, the fixed barrel 12 is a constituent member formed in a substantially cylindrical shape as a whole, having a flange section 12c formed at a front end edge portion thereof, and fixed to the not-shown camera body (via the lens mount section 11 or the like). In the state in which the zoom lens barrel 1 is assembled, the flange section 12c of the fixed barrel 12 plays a role of a stopper that restricts (prohibits) the zoom ring 14 explained below from moving forward in the optical axis O direction and suppresses the zoom ring 14 from coming off. The cam-ring rotation groove 12a piercing through the fixed barrel 12 in the radial direction is formed in a predetermined cam shape on a cylindrical circumferential surface of the fixed barrel 12. The moving-barrel straight-advancing groove 12b is formed in the optical axis O direction on a cylindrical inner circumferential surface of the fixed barrel 12. As explained above, the rotation key 17a of the cam ring 17 engages with the cam-ring rotation groove 12a of the fixed barrel 12. As explained above, the straight-advancing key 15a of the moving barrel 15 engages with the moving-barrel straight-advancing groove 12b of the fixed barrel 12.

On an outer circumference side of the fixed barrel 12, as shown in FIG. 8 and FIG. 9, the zoom ring 14 is disposed to be capable of turning with respect to the fixed barrel 12. The zoom ring 14 is formed in a substantially cylindrical shape having a predetermined length dimension in the optical axis O direction. The cam-ring coupling groove 14a is formed in a direction along the optical axis O on an inner circumferential surface of the zoom ring 14. As explained above, the rotation key 17a protrudingly provided outward from the outer circumferential surface of the cam ring 17 piercing through the cam-ring rotation groove 12a engages in the cam-ring coupling groove 14a.

Further, in a part closer to a rear end of the zoom ring 14, a step section 14c is formed to be slightly small in an outer circumferential diameter. An outer circumferential surface of the step section 14c covers the annular rear cover 13 with a space provided between the outer circumferential surface and the rear cover 13. The zoom ring 14 is capable of rotating relatively to the rear cover 13. Therefore, the zoom ring 14 is capable of turning on the outer circumferential surface of the fixed barrel 12. A front side of the zoom ring 14 is restricted (prohibited) by the flange section 12c of the fixed barrel 12 and a rear side of the zoom ring 14 is restricted (prohibited) by the rear cover 13 from moving to advance and retract in the optical axis O direction. With this configuration, the zoom ring 14 is restricted (prohibited) from moving to advance and retract in the optical axis direction with respect to the fixed barrel 12 and is only capable of turning. Note that, in a part on an outer circumferential surface of the zoom ring 14, surface machining treatment, for example, knurling suitable for the user to perform manual turning operation is applied over an entire circumference. That is, the part applied with the knurling is set as an operation region.

On a rear surface of the fixed barrel 12, the lens mount section 11 is fixedly provided by fixing means such as screwing. The rear cover 13 is disposed between the zoom ring 14 and the lens mount section (a lens mount member) 11. The rear cover 13 is held and fixed by the fixed barrel 12 and the lens mount section 11 (see FIG. 8). The lens mount section 11 is a connecting section formed in an annular shape from, for example, a metal member such as stainless steel or a resin material such as engineering plastics and connected to a body side mount section of the camera body (not shown in the figure) by means such as bayonet connection. A configuration of the lens mount section 11 itself is a configuration well known in the past. Therefore, detailed explanation of the configuration is omitted assuming that a lens mount section having a general structure in the past is applied.

With this configuration, when the zoom ring 14 is turned by, for example, manual operation of the user, the rotation key 17a that engages with the cam-ring coupling groove 14a of the zoom ring 14 moves along the cam-ring rotation groove 12a. Then, the cam ring 17 is extended forward while turning. At this point, the focus ring 16, the moving barrel 15, and the straight-advancing barrel 18 are extended in the optical axis O direction integrally with the cam ring 17 without rotating irrespective of the rotation of the cam ring 17. According to the rotation of the cam ring 17, the zoom barrel 24 and the second group barrel 21 are extended in the direction along the optical axis O by predetermined amounts corresponding to shapes of the cam grooves (17c and 17d) thereof respectively via the Z barrel cam pin 24b cam-fit in the first group cam groove 17c and the second group cam pin 21b cam-fit in the second group cam groove 17d.

That is, in the zoom lens barrel 1 in the present embodiment, the first group lens 41 held by the first group barrel 25 and the second group lens 42 held by the second group barrel 21 are zoom lens groups involved in zooming.

Next, main components of a focus driving unit in the zoom lens barrel 1 in the present embodiment are explained below mainly with reference to FIG. 7.

The focus driving unit in the zoom lens barrel 1 in the present embodiment is mainly configured by the focus ring 16 (not shown in FIG. 7; see FIG. 5, FIG. 8, FIG. 9, and the like), which is the focus operation member, a third group barrel 26 that holds the third group lens 43, a fourth group barrel 31 that holds the fourth group lens 44, an electric barrel 32 that fixes and holds electric components such as a main substrate 33, a third group supporting shaft 28 that supports the third group barrel 26 to be movable in the optical axis O direction, a third group barrel rotation stop shaft 30 that restricts (prevents or prohibits) the third group barrel 26 from rotating about the third group supporting shaft 28, a focus motor 27 functioning as a driving source for driving the third group barrel 26, which holds the focus lens group (the third group lens 43), to advance and retract in the optical axis O direction, a driving mechanism (a motor base 36, a lead screw 27a, a focus nut 35, and the like) for driving, using a driving force of the focus motor 27, the third group barrel 26 (the third group lens 43) to move to advance and retract in the optical axis O direction, and the like.

As shown in FIG. 8 and FIG. 9, the third group lens 43 is a movable lens group disposed behind the second group lens 42. As explained below, the third group lens 43 is a focus lens group involved in focusing. The third group lens 43 is held by the third group barrel 26. The third group barrel 26 is formed to include, as shown in FIG. 7, a holding barrel section that holds the third group lens 43 substantially in a center portion and three arm sections projecting outward in the radial direction from a predetermined part of the holding barrel section.

In one of the three arm sections of the third group barrel 26, a supporting sleeve 26a including a through-hole, through which the third group supporting shaft 28 explained below is inserted and a third-group-barrel urging spring 29 is externally inserted, is extended in a direction parallel to the optical axis O. In one of the three arm sections of the third group barrel 26, a rotation stop groove 26b formed in a U shape in order to precisely inserting the third group barrel rotation stop shaft 30 by loose fitting is formed. In another one of the three arm sections of the third group barrel 26, a nut receiving section 26c formed in a U shape to be capable of coming into contact with the focus nut 35 explained below (see FIG. 7) while avoiding interference with the lead screw 27a of the focus motor 27 (not shown in FIG. 8; see FIG. 7 and FIG. 9) is formed.

The third group barrel 26 is held on the fourth group barrel 31 (explained below; see FIG. 7, FIG. 8, FIG. 9, and the like), which is a fixed barrel, via the third group supporting shaft 28 to be capable of advancing and retracting in the direction along the optical axis O. As explained above, the third group supporting shaft 28 is inserted through the supporting sleeve 26a and cantilevered and fixed by the fourth group barrel 31. Consequently, the third group supporting shaft 28 supports the third group barrel 26 to be capable of moving in the optical axis O direction.

The third-group-barrel urging spring 29 having an elastic force is disposed on an outer circumferential surface of the supporting sleeve 26a. The third-group-barrel urging spring 29 is held between the third group barrel 26 and the fourth group barrel 31 and disposed in an always-charged state. That is, the elastic force of the third-group-barrel urging spring 29 acts in a direction in which the third group barrel 26 is separated from the fourth group barrel 31 in the optical axis O direction. At this point, the nut receiving section 26c comes into contact with the focus nut 35, whereby a position in the optical axis O direction of the third group barrel 26 is restricted. The focus nut 35 screws with the lead screw 27a as explained below to be restricted from moving in the optical axis O direction. Therefore, with this configuration, a predetermined space is kept between the third group barrel 26 and the fourth group barrel 31 by the elastic force of the third-group-barrel urging spring 29. Note that, as explained above, the third group barrel rotation stop shaft 30 implanted in the fourth group barrel 31 is disposed to be engaged with the rotation stop groove 26b of the third group barrel 26. Therefore, the third group barrel 26 is restricted (prevented or prohibited) from rotating about the third group supporting shaft 28 by the third group barrel rotation stop shaft 30.

As shown in FIG. 8 and FIG. 9, the fourth group lens 44 is a fixed lens group disposed behind the third group lens 43. The fourth group lens 44 is held by the fourth group barrel 31. The fourth group barrel 31 includes a holding barrel section 31a that holds the fourth group lens 44 substantially in a center portion. A fixed section 31b having a substantially tabular shape is formed on an outer circumference side of the holding barrel section 31a. As shown in FIG. 8 and FIG. 9, an outer circumferential edge portion of the fixed section 31b of the fourth group barrel 31 is fixed on an inner circumference side of the lens mount section 11. On a front surface side of the fixed section 31b, the third group supporting shaft 28 and the third group barrel rotation stop shaft 30 are implanted in the direction along the optical axis O. The electric barrel 32 is disposed on a front surface side of the fixed section 31b of the fourth group barrel 31. As shown in FIG. 7, the electric barrel 32 is formed in a shape for not preventing an optical path of the fourth group lens 44 and, as a specific shape in the present embodiment, formed in a shape obtained by cutting a plate member having an annular shape into a half. A recessed cutout 32b for avoiding interference with the third group barrel rotation stop shaft 30 is formed in a part of an outer circumferential edge portion of the electric barrel 32. Further, the electric barrel 32 is formed to include a FPC guide 32a formed to extend in the direction along the optical axis O. The FPC guide 32a functions as a guide section for securing disposition of the flexible printed board for position detection 20 extended from the main substrate 33 explained below. Note that it goes without saying that the shape of the electric barrel 32 is not limited to such a shape.

The main substrate 33 is held on a front surface side of the electric barrel 32. The main substrate 33 is formed in, for example, a shape substantially the same as the shape of the electric barrel 32. On a mounting surface of the main substrate 33, various electric components including, for example, a connector 34 are mounted. The connector 34 mounted on the main substrate 33 is, for example, an electric component that connects the flexible printed board for position detection 20. That is, one end of the flexible printed board for position detection 20 is connected to the connector 34. The photointerrupter 19 is disposed at the other end (see FIG. 7, FIG. 8, and FIG. 9).

On the other hand, as shown in FIG. 9, in a space on a front surface side of the fixed section 31b of the fourth group barrel 31 and on an opposite side of a disposed part of the electric barrel 32 across the optical axis O, the focus motor 27 (a focus driving source) and the driving mechanisms (the motor base 36, the lead screw 27a, the focus nut 35, and the like) for moving the third group barrel 26 (the third group lens 43) to advance and retract in the optical axis O direction using a driving force of the focus motor 27 are disposed.

As shown in FIG. 9, the focus motor 27 is fixedly provided, for example, on an inner circumferential surface of the lens mount section 11 functioning as a fixed section. The focus motor 27 is an electric motor configured from a pulse motor or the like and configured to be capable of rotating normally and reversely. Note that a flexible printed board for focus motor 27b is extended from the focus motor 27. The flexible printed board 27b is a connecting member that electrically connects the focus motor 27 and, for example, the main substrate 33.

The lead screw 27a, on an outer circumferential surface of which a spiral male screw section is formed, is provided in a rotating shaft of the focus motor 27. The rotating shaft of the lead screw 27a is disposed in the direction parallel to the optical axis O. A proximal end portion and a distal end portion of the lead screw 27a are axially supported by the motor base 36 to be capable of turning. The motor base 36 is formed by, for example, bending a thin tabular member of metal.

The focus nut 35 is screwed with the lead screw 27a. The focus nut 35 is a nut member formed to include a spiral female screw section that can screw with a male screw section of the lead screw 27a. Although not shown in the figure, the focus nut 35 is restricted (prohibited) from turning by a not-shown fixed section. With this configuration, when the focus motor 27 is driven and the lead screw 27a normally and reversely rotates, the focus nut 35 is configured to move to advance and retract in the axial direction of the lead screw 27a, that is, the direction parallel to the optical axis O without rotating. As explained above, the nut receiving section 26c of the third group barrel 26 is always set in indirect contact with the focus nut 35 by the elastic force of the third-group-barrel urging spring 29 (see FIG. 8 and FIG. 9). That is, the elastic force of the third-group-barrel urging spring 29 acts in a direction in which the third group barrel 26 and the fourth group barrel 31 are separated. Therefore, when the lead screw 27a normally and reversely rotates and the focus nut 35 moves to advance and retract in the direction parallel to the axial direction of the lead screw 27a (the optical axis O) as explained above, the third group barrel 26 is configured to move to advance and retract in the same direction in association with the movement of the focus nut 35.

More specifically, for example, when the focus nut 35 moves forward (to an object side) in the optical axis O direction on the lead screw 27a according to rotation of the lead screw 27a, since the elastic force of the third-group-barrel urging spring 29 acts in a direction in which the nut receiving section 26c is indirectly brought into contact with the focus nut 35, the nut receiving section 26c of the third group barrel 26 follows the focus nut 35 forward and the third group barrel 26 moves forward. Therefore, a contact state of the nut receiving section 26c and the focus nut 35 is always retained by the elastic force of the third-group-barrel urging spring 29. For example, when the focus nut 35 moves backward in the optical axis O direction on the lead screw 27*a* according to the rotation of the lead screw 27*a*, the focus nut 35 pushes the nut receiving section 26*c* of the third group barrel 26 backward and moves the third group barrel 26 backward. At this point, the third group barrel 26 acts to contract the third-group-barrel urging spring 29. Therefore, the contact state of the nut receiving section 26*c* and the focus nut 35 is always retained by the elastic force of the third-group-barrel urging spring 29. The other components are substantially the same as the components of the zoom lens barrel in the past.

In the zoom lens barrel 1 in the present embodiment configured as explained above, when the zoom lens barrel 1 is changed to the collapsed state, the focus ring 16 is housed on an inner side of the fixed barrel 12. When the zoom lens barrel 1 is changed to the photographable use state, the focus ring 16 moves forward from the inner side of the fixed barrel 12 along the optical axis O and is disposed in a position where turning operation can be performed from the outside. That is, the zoom lens barrel 1 is configured such that the disposition of the focus ring 16 is different during the non-use of the zoom lens barrel 1 (when the zoom lens barrel 1 is changed to the non-photographing state) and during the use of the zoom lens barrel 1 (when the zoom lens barrel 1 is changed to the photographable state).

Next, an electric configuration of the zoom lens barrel 1 in the present embodiment is explained below mainly with reference to FIG. 10. FIG. 10 is an electric circuit block diagram showing an overview of a main part of an electric configuration of the zoom lens barrel in the present embodiment.

The zoom lens barrel 1 includes, as electric constituent members, a control section 51, which is control means, a zoom encoder 52, which is a zoom position detection sensor, a focus-lens driving section 53, the photointerrupter 19 (see FIG. 7 and the like), which is the distance-ring rotating position detection sensor and the focus ring encoder, a focus lens encoder 55, which is a position detection sensor of a focus lens group, and the like.

Electric driving control of the zoom lens barrel 1 is performed by the control section 51, which is the control means including an ASIC (application specific integrated circuit), which is an electronic component (an integrated circuit) mounted and disposed on, for example, the main substrate 33. Although not particularly shown in figures other than FIG. 10, the control section 51 is mounted and disposed on, for example, the main substrate 33. Besides this form, the control section 51 may be mounted and disposed on an electric substrate disposed in, for example, the not-shown camera body. The zoom encoder 52, the focus-lens driving section 53, the photointerrupter 19, the focus lens encoder 55, and the like are electrically connected to the control section 51.

The zoom encoder 52 is the position detection sensor that detects a rotating position of the zoom ring 14 (the zoom ring or the focal-length changing ring). The zoom encoder 52 is a detection sensor that detects the rotating position of the zoom ring 14 to detect a state of the zoom lens barrel 1, that is, whether the zoom lens barrel 1 is in the collapsed state or the photographable use state (a zoom operation possible state) and the like. Although not particularly shown in the figures other than FIG. 10, the zoom encoder 52 is appropriately disposed in, for example, a predetermined position in a vicinity of the zoom ring 14.

The focus-lens driving section 53 is an electronic component including a driver that performs driving control of the focus motor 27. Although not particularly shown in the figures other than FIG. 10 either, the focus-lens driving section 53 may be mounted and disposed on, for example, the main substrate 33 or may be mounted and disposed on the electric substrate disposed in the not-shown camera body.

The focus lens encoder 55 is the position detection sensor that detects a position in the optical axis O direction of the third group barrel 26 that holds the third group lens 43, which is the focus lens group. Although not particularly shown in the figures other than FIG. 10 either, the focus lens encoder 55 is appropriately disposed in, for example, a predetermined position in a vicinity of the third group barrel 26.

The photointerrupter 19 (see FIG. 7 and the like) is the distance-ring rotating position sensor that detects rotation of the focus ring 16 (the distance ring). As explained in detail with reference to FIG. 7, FIG. 8, FIG. 9, and the like, the photointerrupter 19 is disposed in a predetermined position in a vicinity of an inner circumference side of the focus ring 16.

In the zoom lens barrel 1 configured as explained above, when the user turns the zoom ring 14 (the zoom ring or the focal length changing ring) in normal and reverse directions around the optical axis O, the turning of the zoom ring 14 is detected by the zoom encoder 52. When the zoom lens barrel 1 is in the photographable use state, the first group barrel 25 and the second group barrel 21, which respectively hold the zoom lens groups (the first group lens 41 and the second group lens 42), respectively move to predetermined positions in the direction along the optical axis O according to a turning amount of the zoom ring 14. A focal length corresponding to a position of the zoom ring 14 is set. At the same time, the control section 51 performs, according to an output signal from the zoom encoder 52, so-called tracking control in which focus motor 27 is controlled to be driven via the focus-lens driving section 53, the third group barrel 26 that holds the focus lens group (the third group lens 43) is moved in the direction along the optical axis O, and a focus state is maintained according to a set zoom position.

It is assumed that the zoom ring 14 is turned by the user and displaced from the photographable use state to the collapsed state. Note that, when this operation is performed, the stopper release button 14*b* needs to be operated by the operator to release the stopper mechanism. In this case as well, the position detection of the zoom ring 14 is performed by the zoom encoder 52. The control section 51 receives an output signal of the zoom encoder 52 at this point, controls to drive the focus motor 27 via the focus-lens driving section 53, moves the third group barrel 26 backward in the optical axis O direction at high speed, and moves the third group barrel 26 to a predetermined collapsed position (see FIG. 8).

Note that when it is assumed that the turning operation of the zoom ring 14 is suddenly performed at this point, for example, it is likely that the zoom lens system (the second group barrel 21) interferes with the focus lens system (the third group barrel 26). However, even if the interference occurs, since the third group barrel 26 is urged forward by the elastic force of the third-group-barrel urging spring 29, the zoom lens system (the second group barrel 21) pushes the focus lens system (the third group barrel 26) backward in the optical axis O direction resisting an urging force of the third-group-barrel urging spring 29. Therefore, the respective lens systems and the respective lens barrels do not receive damages such as breakage.

On the other hand, the photointerrupter 19, which is a focus ring encoder, detects manual turning operation of the focus ring 16 by the user. The control section 51 receives an output signal from the photointerrupter 19 corresponding to the turning operation of the focus ring 16, calculates a rotation amount, rotating speed, and a rotating direction, and controls to drive the focus motor 27 via the focus-lens driving section 53. Consequently, the third group barrel 26 that holds the focus lens group (the third group lens 43) moves to advance and retract in the direction along the optical axis O.

The control section 51 receives an instruction signal for autofocus (AF) operation generated by, for example, operation of a first stage of shutter release among operation members on the camera body (not shown in the figure) side (so-called half-press operation) or touch operation from a touch sensor or the like (not shown in the figure) disposed in a display device or the like (not shown in the figure) on the camera body side and controls to drive the focus motor 27 via the focus-lens driving section 53.

As explained above, according to the first embodiment, in the zoom lens barrel 1 displaceable between the collapsed state (the retracted state) during the non-photographing and the extended state (the use state), which is the photographable state and more extended than the retracted state, when the zoom lens barrel 1 is changed to the collapsed state (the retracted state), the focus ring 16 is housed on the inside of the fixed barrel 12. During un-photographable time, the first and second annular members are disposed to overlap in the radial direction. With this configuration, in the zoom lens barrel 1, it is possible to easily realize a reduction in an entire length in the optical axis O direction when the zoom lens barrel 1 is changed to the collapsed state (the retracted state).

In the zoom lens barrel 1, when the zoom lens barrel 1 is changed to the use state (the extended state), the focus ring 16 is extended forward from the inner side of the fixed barrel 12 and disposed in an extended position and an operation region formed on an outer circumferential surface of the focus ring 16 is exposed to the outside. In this configuration, for example, a reduction in entire length in the optical axis O direction is not set concerning the focus ring 16 itself. Therefore, in the zoom lens barrel 1 in the present embodiment, operability of the focus ring is not spoiled and satisfactory operability is retained when the zoom lens barrel 1 is changed to the use state (the extended state).

Note that, in the first embodiment, the focus ring is housed in the fixed barrel. However, separately from this, the zoom ring may be housed instead of the focus ring. When this configuration is adopted, in order to perform the displacement from the collapsed state to the use state and the displacement from the use state to the collapsed state according to rotating operation of the zoom ring, a configuration only has to be devised to, for example, adopt an electric configuration for using a driving force of a zoom motor or the like or house a part of the length in the optical axis direction of the zoom ring in the fixed barrel and make a part of the length operable from the outside in order to secure intentional manual operation by the operator.

In the first embodiment, the entire length in the optical axis direction of the focus ring is entirely housed in the fixed barrel. However, the present invention is not limited to this and at least a part of the length in the optical axis direction of the focus ring may be housed in the fixed barrel.

The invention of the first embodiment can be expressed as explained below. For example, a zoom lens barrel of the present invention displaceable between a retracted state during non-photographing and a photographable state, which is an extended state more extended than the retracted state may be considered to include a fixed barrel, a focal-length changing ring (a zoom ring) having a predetermined length dimension in an optical axis direction, provided on an outer circumference side of the fixed barrel, and capable of rotating around the fixed barrel, a straight-advancing barrel disposed on an inner side of the fixed barrel, an entire length of the straight-advancing barrel being housed on the inner side of the fixed barrel in the retracted state and the straight-advancing barrel advancing and retracting in the optical axis direction without rotating according to rotating operation of the focal-length changing ring, a distance ring, at least a part of an outer circumferential surface of which is housed in the fixed barrel in the retracted state, the distance ring being rotatably provided on an outer circumference side of the straight-advancing barrel, a focusing lens disposed on an inside of the zoom lens barrel and driven according to rotation of the distance ring, a cam ring, at least a part of which is housed in the fixed barrel in the retracted state, the cam ring including a cam groove, advancing and retracting in the optical axis direction together with the straight-advancing barrel, and rotating relatively to the straight-advancing barrel, and a lens barrel, at least a part or an entire length of which is housed in the fixed barrel in the retracted state, the lens barrel supporting an optical system, which is a most distal end face of the zoom lens barrel, and being driven in the optical axis direction by the straight-advancing barrel and the cam groove. The invention of the first embodiment can be expressed as explained below. For example, a zoom lens barrel of the present invention displaceable between a retracted state during non-photographing and a photographable state, which is an extended state more extended than the retracted state may be considered to include a fixed barrel formed in an annular shape and having length in an optical axis direction, a straight-advancing barrel relatively moving in the optical axis direction with respect to the annular fixed barrel and housed in the fixed barrel in a non-photographing state and extended to an outside of the fixed barrel in a photographing state, and a first annular member placed in the straight-advancing barrel, having length in the optical axis direction, and made of an annular member that turns around the optical axis according to manual operation. When the lens barrel is in a photographable state, a part of an outer circumference of an exterior of the first annular member is exposed to the outside and a front end face of the annular member forward in an optical axis direction is located further forward than a front end face of the fixed barrel forward in the optical axis direction. When the lens barrel is in an un-photographable state in which the lens barrel is further retracted in the optical axis direction than in the photographing state, a rear end face backward in the optical axis direction is within the fixed barrel and the rear end face is present further backward in the optical axis direction than when the lens barrel is in the photographable state.

Note that, in the first embodiment, the zoom lens barrel applied to the photographing apparatus (the camera) of the lens replaceable type is explained as an example. However, the present invention is not limited to this form. The present invention can also be applied to, in a completely same configuration, a zoom lens barrel unit of a photographing apparatus (a camera) of a lens integral type. In that case, it is possible to obtain effects completely the same as the effects by the first embodiment explained above.

In the first embodiment, as shown in FIG. 8 and FIG. 9, the constituent members such as the first group barrel 25, the zoom barrel 24, the second group barrel 21, the straight-advancing barrel 18, the focus ring 16, the moving barrel 15, the cam ring 17, the fixed barrel 12, the zoom ring 14, and the rear cover 13 are represented as resin members and the lens mount section 11 is represented as a metal member using hatching. However, the present invention is not limited to this. For example, the lens mount section 11 may be made of a resin material. All the constituent members enumerated above (25, 24, 21, 18, 16, 15, 17, 12, 14, 13, etc.) may be formed by, for example, cutting using metal members.

Second Embodiment

A second embodiment of the present invention is an illustration in which, for example, the present invention is applied to a replaceable type zoom lens barrel applied to a photographing apparatus such as a digital camera (hereinafter simply referred to as camera) configured to be capable of photoelectrically converting, using a solid-state image pickup device, an optical image formed by an optical lens, converting an image signal obtained by the photoelectric conversion into digital image data representing a still image or a movie, recording digital data generated in this way in a recording medium, and reproducing and displaying the still image or the movie on a display apparatus on the basis of the digital image data recorded in the recording medium.

The replaceable type zoom lens barrel in the present embodiment is a zoom lens barrel configured to be detachably attachable to a camera functioning as an optical apparatus. Further, the replaceable type zoom lens barrel in the present embodiment is a lens barrel of a collapsible type including a collapsible mechanism that changes to a more retracted state during non-photographing than during photographing and changes to a more extended state during the photographing than during the non-photographing.

In the present embodiment, an optical axis of a photographing optical system of the zoom lens barrel is represented by a sign O. In a direction along the optical axis O, a side on which an object opposed to a front surface of a camera (not shown in the figure) mounted with the zoom lens barrel during use is present is referred to as front and a side on which a lens-side mount section coupled to a lens mounting section (a mount section) provided on the front surface of the camera is present is referred to as back.

Note that, in the respective drawings used for the following explanation, scales are sometimes varied for each of constituent elements in order to show the respective constituent elements in sizes of degrees recognizable on the drawings. Therefore, the present invention is not limited to only forms shown in the figures concerning quantities of the constituent elements described in the drawings, shapes of the constituent elements, ratios of sizes of the constituent elements, and relative positional relations among the respective constituent elements.

Figure 11:
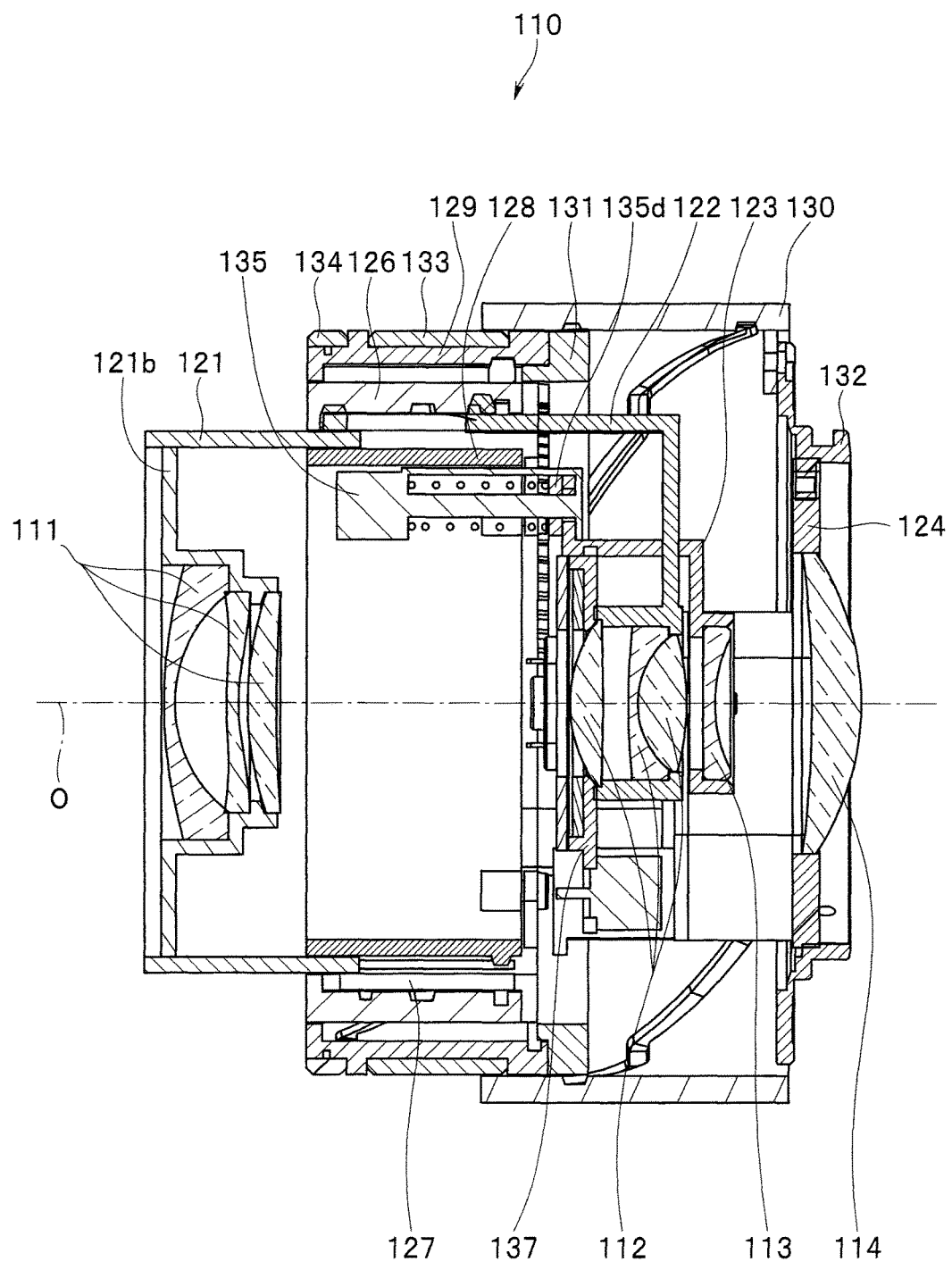
FIG. 11 is a longitudinal sectional view cut on a surface along an optical axis in a wide state during photographing of a replaceable zoom lens barrel in an embodiment of the present invention.
Figure 12:
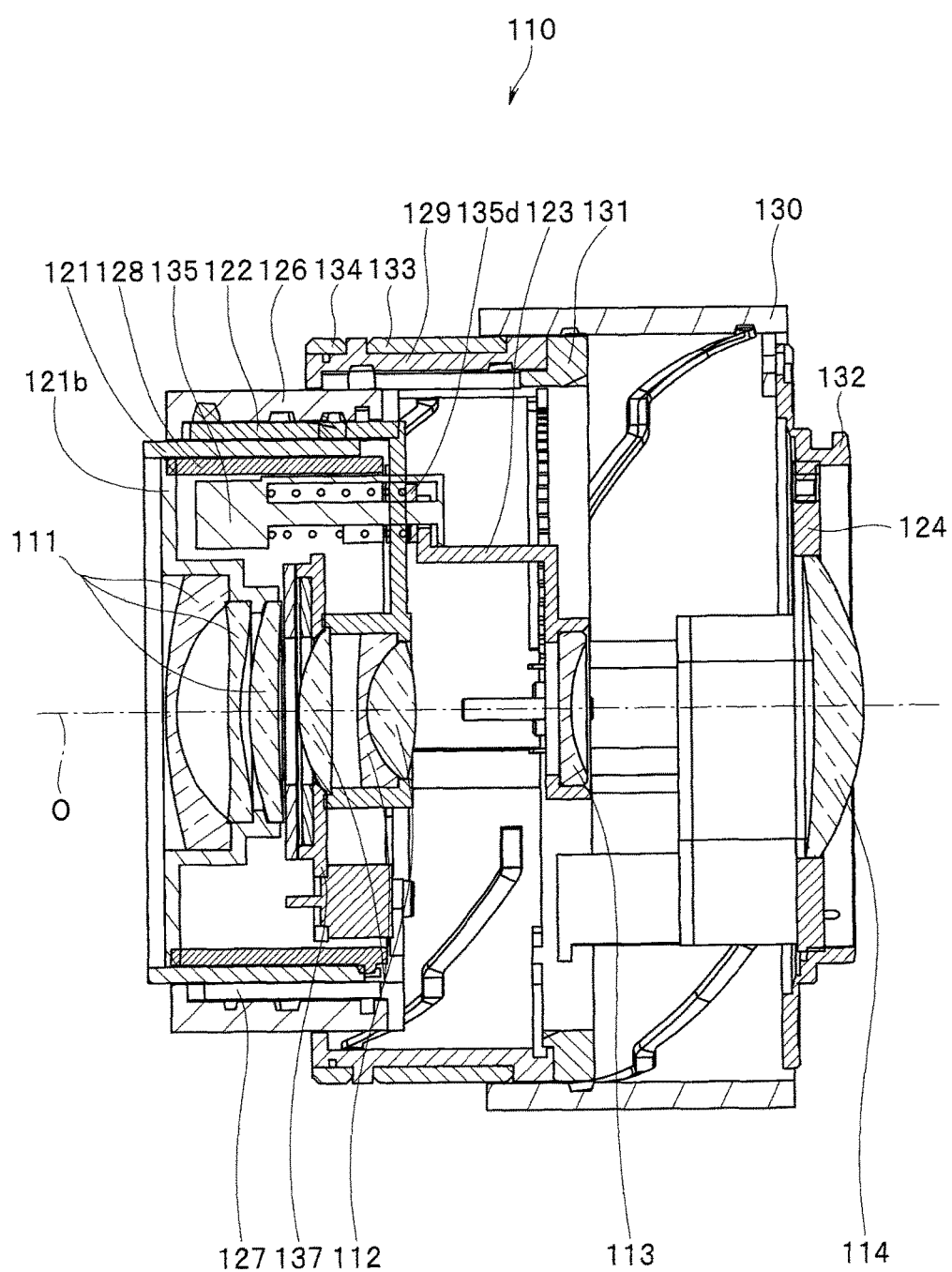
FIG. 12 is a longitudinal sectional view cut on the surface along the optical axis in a telephoto state during the photographing of the replaceable zoom lens barrel in the embodiment of the present invention.
Figure 13:
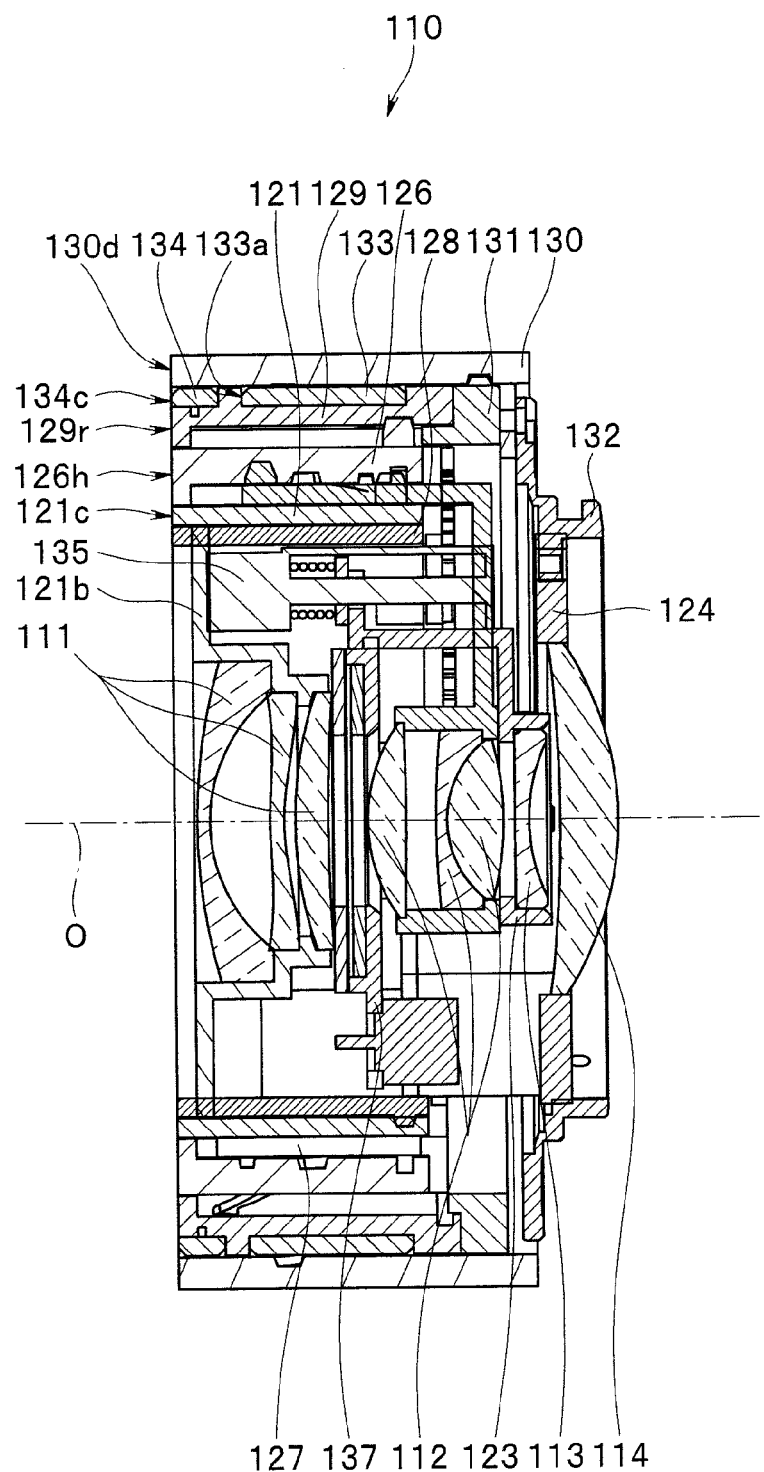
FIG. 13 is a longitudinal sectional view cut on the surface along the optical axis in a collapsed state during non-photographing of the replaceable zoom lens barrel in the embodiment of the present invention.
Figure 14:
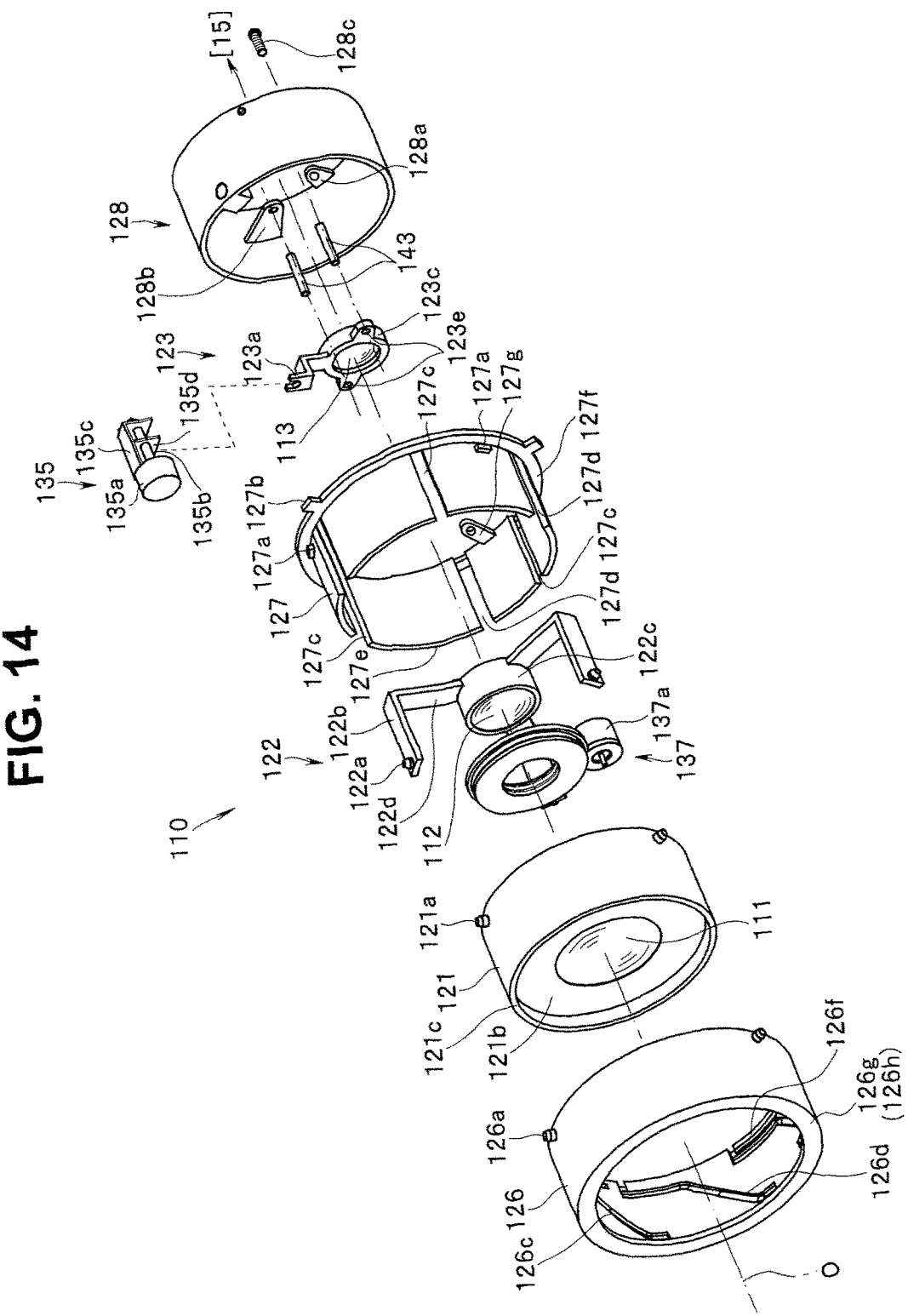
FIG. 14 is an exploded perspective view showing constituent members of a substantially front half portion of the replaceable zoom lens barrel shown in FIG. 11.
Figure 15:
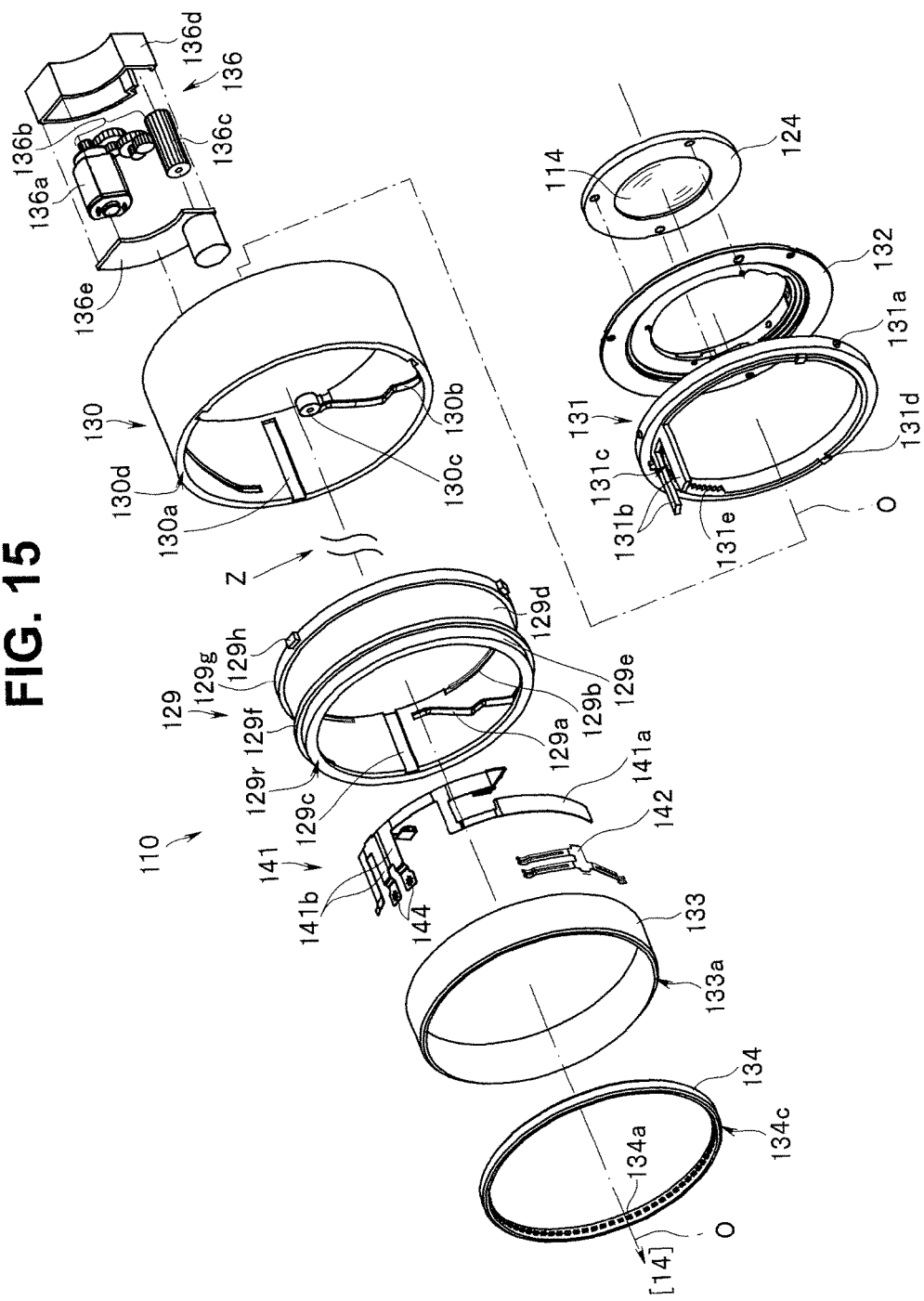
FIG. 15 is an exploded perspective view showing constituent members of a substantially rear half portion of the replaceable zoom lens barrel shown in FIG. 11.

FIG. 11 to FIG. 15 are diagrams showing a replaceable zoom lens barrel, which is a lens barrel in the second embodiment of the present invention. FIG. 11 to FIG. 13 are longitudinal sectional views cut on a surface along an optical axis (a plane including the optical axis) of the replaceable zoom lens barrel in the present embodiment. Among the figures, FIG. 11 shows a so-called wide state in which the replaceable zoom lens barrel in the present embodiment is in a state during photographing and set closest to a short focus side among focal lengths that can be set by the photographing optical system. FIG. 12 shows a so-called telephoto state in which the replaceable zoom lens barrel is in the state during photographing and is set closest to a long focus side among the focal lengths that can be set by the photographing optical system. FIG. 13 shows a so-called collapsed state in which the replaceable zoom lens barrel is in a state during non-photographing. FIG. 14 and FIG. 15 are exploded perspective views of the replaceable zoom lens barrel in the present embodiment. Of the exploded perspective views, FIG. 14 shows constituent members that are in a center portion in an arrangement of members in the exploded perspective view of the replaceable type zoom lens barrel and mainly shows a driving system of a lens system. FIG. 15 shows configurations of members on both sides of the members shown in FIG. 14 in the arrangement of the members in the exploded perspective view of the replaceable type zoom lens barrel.

A replaceable type zoom lens barrel 110 in the present embodiment includes a plurality of lens groups (a first lens group 111, a second lens group 112, a third lens group 113, and a fourth lens group 114) configuring a photographing optical system, a plurality of lens holding barrels (a first group holding barrel 121, a second group holding barrel 122, a third group holding barrel 123, and a fourth group holding barrel 124) respectively holding these lens groups, driving barrel members (a cam barrel 126, a straight-advancing barrel 127, a moving barrel 128, an operation-ring holding barrel 129, and a rotating barrel 131) for appropriately moving each of the plurality of lens holding barrels separately in a direction along the optical axis O at predetermined timing, a plurality of annular operation members (a third barrel; a zoom ring 133 and a distance ring 134), an operation-ring holding barrel 129 (a second barrel) that holds the plurality of annular operation members (the zoom ring 133 and the distance ring 134) to be capable of rotating around the optical axis O, a fixed barrel 130 (a first barrel), a mount ring 132, which is a lens-side mount section functioning as a coupling section to a camera main body (not shown in the figure), a driving system unit (a focus driving unit 135 and a zoom driving unit 136), and an aperture unit (a diaphragm device) 137.

As explained above, the photographing optical system in the replaceable type zoom lens barrel 110 in the present embodiment is configured by four lens groups, that is, the first lens group 111, the second lens group 112, the third lens group 113, and the fourth lens group 114 disposed along the optical axis O from a front side (see FIG. 14).

Among the lens groups, the first lens group 111 is fixed and held by the first group holding barrel 121. The first group holding barrel 121 includes openings in a front and a back. The entire first group holding barrel 121 is formed in a substantially cylindrical shape. The first group holding barrel 121 further includes an inward flange-like holding section 121b in a vicinity of a substantially center portion. The first lens group 111 is fixed and held in the substantially center portion of the holding section 121b. In a vicinity of a rear end edge portion on an outer circumferential surface of the first group holding barrel 121, a plurality of (in the present embodiment, three) cam pins 121a protrudingly provided outward in a radial direction are formed. The plurality of cam pins 121a are disposed at substantially equal intervals in a circumferential direction on the outer circumferential surface of the first group holding barrel 121. The plurality of cam pins 121a are inserted through a first straight-advancing groove 127c of the straight-advancing barrel 127 and cam-connected to a spiral first cam groove 126c of the cam barrel 126.

The second lens group 112 is fixed and held by the second group holding barrel 122. The second group holding barrel 122 is configured by a holding section 122c including openings in a front and a back and formed in a substantially cylindrical shape as a whole, a plurality of (in the present embodiment, three) first arm sections 122d extended outward in the radial direction from a vicinity of a rear end edge portion on an outer circumferential surface of the holding section 122c, a plurality of (in the present embodiment, three) second arm sections 122b extended forward along the optical axis O respectively from distal ends of the plurality of first arm sections 122d, and a plurality of (in the present embodiment, three) cam pins 122a protrudingly provided outward in the radial direction on an outer surface side in vicinities of respective distal end portions of the plurality of second arm sections 122b. The plurality of first arm sections 122d are disposed at substantially equal intervals in the circumferential direction on the outer circumferential surface of the holding section 122c. The plurality of cam pins 122a are inserted through a second straight-advancing groove 127d of the straight-advancing barrel 127 and cam-connected to a spiral second cam groove 126d of the cam barrel 126.

In the second group holding barrel 122, the aperture unit 137 is provided forward in an optical axis direction. The aperture unit 137 is configured by, for example, a plurality of diaphragm vane members, a driving mechanism that drives the plurality of diaphragm vane members, and a diaphragm driving motor 137a functioning as a driving source of the driving mechanism. A basic configuration of the aperture unit 137 is applied with a mechanism same as the mechanism generally put to practical use in the past. Therefore, explanation of a detailed configuration of the aperture unit 137 is omitted.

The third lens group 113 is a focus lens group (a focusing lens group) that mainly contributes to focus adjustment. The third lens group 113 is fixed and held by the third group holding barrel 123. The third group holding barrel 123 includes openings in a front and a back and is formed in a substantially annular shape as a whole. The third group holding barrel 123 includes a barrel section 123c having a substantially annular shape, an arm section 123d extended outward in the radial direction from a part of an outer circumferential surface of the barrel section 123c and having a U-shape groove 123a formed at a distal end, and a plurality of (in the present embodiment, two) supporting sections 123e protrudingly provided outward in the radial direction from the outer circumferential surface in a part different from the arm section 123d. Through-holes are drilled in the plurality of supporting sections 123e in the direction along the optical axis O. In each of the through-holes, (two) supporting shafts 143 are inserted. The two supporting shafts 143 are disposed in parallel to the optical axis O. One end sides of the respective supporting shafts 143 are respectively fixed to two supporting sections 128b (one is not shown in the figure) of the moving barrel 128 explained below. Therefore, the third group holding barrel 123 is supported to be capable of moving along the optical axis O. In this case, the third group holding barrel 123 is urged, for example, forward in the direction along the optical axis O by a not-shown urging member. In the U-shape groove 123a of the arm section 123d of the third group holding barrel 123, a lead screw 135b of the focus driving unit 135 explained below is loose-fit. The third group holding barrel 123 is configured to be pressed by a nut 135d, which fits in the lead screw 135b and moves in the direction along the optical axis O, and move in the same direction (the direction along the optical axis O), and move, according to movement of the nut 135d in a pressing releasing direction, in the same direction (the pressing releasing direction of the nut 135d) with an urging force of the urging member (not shown in the figure). The configuration shown in FIG. 14 is as explained above.

In FIG. 15, the fourth lens group 114 is fixed and held by the fourth group holding barrel 124. The fourth group holding barrel 124 is a barrel member including a circular opening in a substantially center portion and formed in a substantially annular shape. The fourth lens group 114 is fixed and held in the substantially center portion of the fourth group holding barrel 124. The fourth group holding barrel 124 is fixed to the mount ring 132 by a screw or the like.

The mount ring 132 is fixed to a fixing section 130c on a rear end side of the fixed barrel 130 by a screw or the like. Therefore, when the replaceable type zoom lens barrel 110 is mounted on a not-shown camera main body via the mount ring 132, the fixed barrel 130 (the first barrel) is fixed to the camera main body (not shown in the figure).

Note that a plurality of lens-side communication contacts 132a (not shown in FIG. 11 to FIG. 15; see FIG. 19 referred to below) are provided in the mount ring 132. The plurality of lens-side communication contacts 132a are electrically connected to a lens-side control section 151 in an electric circuit section (not shown in FIG. 11 to FIG. 15; see FIG. 19 referred to below) provided on an inside of the replaceable type zoom lens barrel 110. The plurality of lens-side communication contacts 132a are disposed in positions where the plurality of lens-side communication contacts 132a come into contact with a plurality of camera-side communication contacts 203 provided in a mount section (not shown in the figure) on the camera main body (see reference numeral 200 in FIG. 19) side when the replaceable type zoom lens barrel 110 is mounted on a regular position of the camera main body (not shown in the figure; see FIG. 19 referred to below). Consequently, electric connection between the camera main body (200) and the replaceable type zoom lens barrel 110 is secured. Note that electric configurations of the camera main body (200) and the replaceable type zoom lens barrel 110 are explained below.

The fixed barrel 130 is a cylindrical member including openings in a front and a back and formed in a substantially cylindrical shape as a whole. On an inner circumferential surface of the fixed barrel 130, a plurality of (in the present embodiment, three) straight-advancing grooves 130a formed to be bottomed and linearly extending from a front end to a predetermined part in a vicinity of a rear end in the direction along the optical axis O and a plurality of (in the present embodiment, three) spiral cam grooves 130b formed to be bottomed and having a predetermined cam curve are formed. The straight-advancing grooves 130a and the cam grooves 130b are formed and disposed at substantially equal intervals in the circumferential direction on the inner circumferential surface of the fixed barrel 130. Respective straight-advancing keys 129h of the operation-ring holding barrel 129 explained below engage with the respective straight-advancing grooves 130a to be capable of sliding in the direction along the optical axis O. Consequently, the straight-advancing grooves 130a of the fixed barrel 130 restrict rotation around the optical axis O of the operation-ring holding barrel 129, which is a straight-advancing member and is a moving member, while supporting the operation-ring holding barrel 129 in a direction in which the operation-ring holding barrel 129 moves straight along the optical axis O. Cam pins 131a of the rotating barrel 131 explained below are cam-connected to the respective cam grooves 130b.

The operation-ring holding barrel 129 is internally inserted on an inner side of the fixed barrel 130. As explained above, the operation-ring holding barrel 129 is a member that holds the plurality of annular operation members (the third barrel; the zoom ring 133 and the distance ring 134) to be capable of rotating around the optical axis O. The zoom ring 133 and the distance ring 134 are movable in the optical axis direction together with the operation-ring holding barrel 129, which is the second barrel. When the replaceable type zoom lens barrel 110 is in non-photographing time, the zoom ring 133 and the distance ring 134 are housed in the fixed barrel 130, which is the first barrel. When the replaceable type zoom lens barrel 110 is in photographing time, the zoom ring 133 and the distance ring 134 are disposed to be exposed from the fixed barrel 130, which is the first barrel. In this state, the zoom ring 133, which is the second annular member, and the distance ring 134, which is the first annular member, are provided to be capable of manually rotating around the optical axis O. A predetermined lens in a barrel in the replaceable type zoom lens barrel 110 is configured to be driven in the optical axis O direction by the manual rotating operation. One of the zoom ring 133 and the distance ring 134 is equivalent to the third barrel.

Note that, in the replaceable type zoom lens barrel 110 in the present embodiment, an example is shown in which one of the zoom ring 133 and the distance ring 134 is configured as the third barrel. That is, in the present embodiment, the third barrel may be configured as the zoom ring 133 or may be configured as the distance ring 134.

For example, when the zoom ring 133 is the third barrel, a configuration is adopted in which the distance ring 134 for performing focus adjustment is disposed in the operation-ring holding barrel 129 as a fourth barrel separate from the third barrel. In this case, the distance ring 134, which is the fourth barrel, takes a form same as the form of the zoom ring 133, which is the third barrel. That is, the distance ring 134 is movable in the optical axis direction together with the operation-ring holding barrel 129, which is the second barrel. When the replaceable type zoom lens barrel 110 is in the non-photographing time, the distance ring 134 is housed in the fixed barrel 130, which is the first barrel. When the replaceable type zoom lens barrel 110 is in the photographing time, the distance ring 134 is disposed to be exposed from the fixed barrel 130, which is the first barrel, and is disposed to be capable of manually rotating around the optical axis O.

On the other hand, the operation-ring holding barrel 129, which is the second barrel, is a barrel member also functioning as a driving barrel member that receives a rotation driving force of the zoom driving unit 136 via the rotating barrel 131 to thereby move to advance and retract in the direction along the optical axis O with respect to the fixed barrel 130 (the first barrel) and contribute to zooming.

That is, the operation-ring holding barrel 129 includes opening in a front and a back and is formed in a substantially cylindrical shape as a whole. On an outer circumferential surface of the operation-ring holding barrel 129, a rib 129f formed over an entire circumference in the circumferential direction in a part closer to a front end and an outward flange section 129g formed over an entire circumference in the circumferential direction likewise in a rear end edge portion are formed. On the outer circumferential surface of the operation-ring holding barrel 129, a distance-ring holding section 129e that holds the distance ring 134 to be capable of rotating around the optical axis O is formed in a part closer to the front end than the rib 129f. The distance ring 134 is disposed to be capable of turning around the optical axis on an outer circumferential surface of the distance-ring holding section 129e. On the outer circumferential surface of the operation-ring holding barrel 129, in a circumferential groove portion 129d formed by the rib 129f and the outward flange section 129g, a zoom ring 133 slightly wider than the distance ring 134 is disposed to be capable of rotating around the optical axis O within a predetermined range. That is, as explained above, the distance ring 134 and the zoom ring 133 are disposed to be capable of moving in the direction along the optical axis O together with the operation-ring holding barrel 129, which is the second barrel.

(A main section 141a of) A flexible printed board 141 and a contact member 142 are disposed between the outer circumferential surface (the circumferential groove portion 129d) of the operation-ring holding barrel 129 and the inner circumferential surface of the zoom ring 133. Further, (a part of an arm section 141b, which is a part of) the flexible printed board 141 is disposed between the outer circumferential surface (the distance-ring holding section 129e) of the operation-ring holding barrel 129 and an inner circumferential surface of the distance ring 134.

Note that, as the operation-ring holding barrel 129, actually, there is also an operation-ring holding barrel configured by integrating three constituent members. Details of the operation-ring holding barrel are explained below (see FIG. 16 to FIG. 18). Detailed configurations concerning the flexible printed board 141 and the contact member 142 are also explained below.

On an outer circumferential surface of the outward flange section 129g, a plurality of (in the present embodiment, three) straight-advancing keys 129h are protrudingly provided outward in the radial direction. The plurality of straight-advancing keys 129h are formed and disposed at substantially equal intervals in the circumferential direction on the outer and inner circumferential surfaces of the operation-ring holding barrel 129. As explained above, the plurality of straight-advancing keys 129h respectively engage with the respective straight-advancing grooves 130a of the fixed barrel 130 to be capable of sliding. Consequently, the operation-ring holding barrel 129 is restricted from rotating around the optical axis O with respect to the fixed barrel 130.

On the other hand, on the inner circumferential surface of the operation-ring holding barrel 129, a plurality of spiral cam grooves 129a, a plurality of bayonet grooves 129b, and a plurality of straight-advancing grooves 129c are formed. The cam grooves 129a have a predetermined cam curve. The plurality of (in the present embodiment, three) cam grooves 129a are formed at substantially equal intervals in the circumferential direction on the inner circumferential surface of the operation-ring holding barrel 129. Cam pins 126a of the cam barrel 126 explained below are respectively cam-connected to the cam grooves 129a via a straight-advancing groove 132c of the rotating barrel 131. Note that a configuration shown in FIG. 14 is disposed in an arrow Z expanded in FIG. 15. The bayonet grooves 129b are a plurality of bottomed groove sections formed in the circumferential direction in a vicinity of a rear end edge portion of the inner circumferential surface of the operation-ring holding barrel 129. One ends of the respective bottomed groove sections of the bayonet grooves 129b are opened toward a rear end side by groove sections extending in the direction along the optical axis O. The plurality of (in the present embodiment, three) bayonet grooves 129b are formed at substantially equal intervals in the circumferential direction on the inner circumferential surface of the operation-ring holding barrel 129. Respective bayonet claws 131d of the rotating barrel 131 explained below bayonet-engage with the respective bayonet grooves 129b. Consequently, the operation-ring holding barrel 129 and the rotating barrel 131 are configured to be capable of turning within a predetermined range relatively to each other and capable of integrally moving in the optical axis O direction. The straight-advancing grooves 129c are bottomed grooves linearly extended from a front end to a rear end in the direction along the optical axis O. The plurality of (in the present embodiment, three) straight-advancing grooves 129c are formed at substantially equal intervals in the circumferential direction on the inner circumferential surface of the operation-ring holding barrel 129. Respective straight-advancing keys 127b of the straight-advancing barrel 127 explained below engage with the respective straight-advancing grooves 129c. Consequently, the operation-ring holding barrel 129 guides movement of the straight-advancing barrel 127 in the direction along the optical axis O and restricts rotation around the optical axis O.

The zoom driving unit 136 is disposed in a space on an inner side of the operation-ring holding barrel 129. The zoom driving unit 136 is fixed to the fixed barrel 130. The zoom driving unit 136 is a constituent unit including a driving mechanism for moving, in the direction along the optical axis O, a lens holding barrel that holds a lens group contributing to zoom operation in a photographing optical system. The zoom driving unit 136 is configured by a zoom lens motor 136a, a driving-force transmission mechanism 136b including a plurality of gears, a long gear 136c, a housing section 136d that houses these constituent members, a lid section 136e, and the like. As a basic configuration of the zoom driving unit 136, a mechanism same as a mechanism generally put to practical use in the past is applied. Therefore, explanation of a detailed configuration of the zoom driving unit 136 is omitted. A driving force of the zoom driving unit 136 is transmitted to (a sector gear 131e of) the rotating barrel 131 explained below via the long gear 136c and drives to rotate the rotating barrel 131 to thereby move to advance and retract the respective lens holding barrels in the direction along the optical axis O.

A part (a fork-like arm section 131b explained below) of the rotating barrel 131 is internally inserted on the inner side of the operation-ring holding barrel 129. The rotating barrel 131 is formed in a substantially annular shape as a whole and includes the fork-like arm section 131b extending forward from a part of an outer circumferential edge portion along the optical axis O and having an open groove section 131c. In this case, the fork-like arm section 131b is formed to extend forward from a position slightly closer to the inner side in the radial direction than an outermost circumferential surface of the rotating barrel 131. One of a plurality of cam pins 126a of the cam barrel 126 is inserted through the open groove section 131c of the fork-like arm section 131b. Note that, as explained above, the cam pins 126a are cam-connected to the cam grooves 129a of the operation-ring holding barrel 129. A plurality of (in the present embodiment, three) cam pins 131a are protrudingly provided outward in the radial direction on the outer circumferential surface of the rotating barrel 131. The plurality of (in the present embodiment, three) cam pins 131a are formed at substantially equal intervals in the circumferential direction on the outer circumferential surface of the rotating barrel 131. The plurality of cam pins 131a are cam-connected to the respective cam grooves 130b of the fixed barrel 130. That is, the rotating barrel 131 is disposed in a state in which the fork-like arm section 131b is internally inserted on the inner side of the operation-ring holding barrel 129 and a state in which an outermost circumferential surface of a rearmost end edge portion is internally inserted on the inner side of the fixed barrel 130. Further, a plurality of bayonet claws 131d are formed on a front surface side in a vicinity of an outer circumferential edge portion of the rotating barrel 131. The plurality of (in the present embodiment, three) bayonet claws 131d are formed at substantially equal intervals in the circumferential direction on a circumferential surface of the rotating barrel 131. The bayonet claws 131d has an eaves-like convex shape projecting further outward in the radial direction from a projecting distal end projecting in the optical axis direction from an end face forward in the optical axis direction of an annular section of the rotating barrel 131. That is, when the bayonet claws 131d are taken along a plane including the optical axis, that is, parallel to the optical axis, the bayonet claws 131d are formed in a hook shape opened in the radial direction. With this shape, the respective bayonet claws 131d bayonet-engage with the respective bayonet grooves 129b of the operation-ring holding barrel 129. In a part of an inner circumferential edge portion of the rotating barrel 131, a sector gear 131e, which an internal gear, is formed. The long gear 136c of the zoom driving unit 136 meshes with the sector gear 131e. Consequently, the rotating barrel 131 is configured to be capable of receiving a driving force from the zoom driving unit 136 and rotating around the optical axis O within a predetermined range.

The cam barrel 126 is internally inserted on an inner side of a part (the fork-like arm section 131b) of the rotating barrel 131. The cam barrel 126 includes openings in a front and a back and is formed in a substantially cylindrical shape as a whole. The cam barrel 126 is formed to include an inward flange 126g in a front end edge portion. The plurality of (in the present embodiment, three) cam pins 126a are protrudingly provided outward in the radial direction in a vicinity of a rear end edge portion on an outer circumferential surface of the cam barrel 126. The plurality of (in the present embodiment, three) cam pins 126a are formed at substantially equal intervals in the circumferential direction on the outer circumferential surface of the cam barrel 126. After being inserted through the open groove section 131c of the fork-like arm section 131b of the rotating barrel 131, the respective cam pins 126a are cam-connected to the cam grooves 129a of the operation-ring holding barrel 129. On an inner circumferential surface of the cam barrel 126, a plurality of cam grooves (126c and 126d) and a plurality of bayonet grooves 126f are formed. Among these grooves, the plurality of (in the present embodiment, three) first cam grooves 126c are formed at substantially equal intervals in the circumferential direction on the inner circumferential surface of the cam barrel 126. As explained above, the respective cam pins 121a of the first group holding barrel 121 after being inserted through the first straight-advancing groove 127c of the straight-advancing barrel 127 are cam-connected to the respective first cam groove 126c. The plurality of (in the present embodiment, three) second cam grooves 126d are also formed at substantially equal intervals in the circumferential direction on the inner circumferential surface of the cam barrel 126. As explained above, the respective cam pins 122a of the second group holding barrel 122 after being inserted through second straight-advancing groove 127d of the straight-advancing barrel 127 are cam-connected to the respective second cam grooves 126d. The bayonet grooves 126f are a plurality of bottomed groove sections formed in the circumferential direction in a vicinity of a rear end edge portion of the inner circumferential surface of the cam barrel 126. One ends of the respective bottomed groove sections of the bayonet grooves 126f are opened toward a rear end side by groove sections extending in the direction along the optical axis O. The plurality of (in the present embodiment, three) bayonet grooves 126f are also formed at substantially equal intervals in the circumferential direction on the inner circumferential surface of the cam barrel 126. Respective bayonet claws 127*a* of the straight-advancing barrel 127 explained below are bayonet-connected to the respective bayonet grooves 126*f*. Consequently, the cam barrel 126 and the straight-advancing barrel 127 are configured to be capable of turning within a predetermined range relatively to each other and capable of integrally moving in the optical axis O direction.

The straight-advancing barrel 127 is internally inserted on an inner side of the cam barrel 126. The straight-advancing barrel 127 includes openings in a front and a back and is formed in a substantially cylindrical shape as a whole. The straight-advancing barrel 127 is formed to include an outward flange 127*f* at a rear end edge portion. A plurality of straight-advancing grooves (127*c* and 127*d*) are formed in a cylindrical section of the straight-advancing barrel 127. Both of the plurality of straight-advancing grooves (127*c* and 127*d*) are through-grooves piercing through in the radial direction. Among the straight-advancing grooves, a plurality of (in the present embodiment, three) first straight-advancing grooves 127*c* are formed in a grooves shape opened from a cylindrical section front end face to a cylindrical section rear end face at substantially equal intervals in the circumferential direction in the cylindrical section of the straight-advancing barrel 127. As explained above, the respective cam pins 121*a* of the first group holding barrel 121 are inserted through the respective first straight-advancing grooves 127*c*. A plurality of (in the present embodiment, three) second straight-advancing grooves 127*d* are also formed in a groove shape opened from a cylindrical section front end face to a cylindrical section rear end face at substantially equal intervals in the circumferential direction on the outer circumferential surface of the straight-advancing barrel 127. The respective cam pins 122*a* of the second group holding barrel 122 are inserted through the respective second straight-advancing grooves 127*d*.

In the outward flange 127*f* at the rear end edge portion of the straight-advancing barrel 127, a plurality of (in the present embodiment, three) straight-advancing keys 127*b* are protrudingly provided outward in the radial direction on an outer circumferential surface of the outward flange 127*f*. The plurality of (in the present embodiment, three) straight-advancing keys 127*b* are formed at substantially equal intervals in the circumferential direction on the outer circumferential surface of the straight-advancing barrel 127. The respective straight-advancing keys 127*b* engage with the respective straight-advancing grooves 129*c* of the operation-ring holding barrel 129. Further, in the straight-advancing barrel 127, a plurality of (in the present embodiment, three) bayonet claw 127*a* extending outward in the radial direction are formed at substantially equal intervals in the circumferential direction on the outer circumferential surface of the straight-advancing barrel 127. The respective bayonet claws 127*a* bayonet-engage with the bayonet grooves 126*f* of the cam barrel 126.

Further, on a cylindrical section inner circumferential surface of the straight-advancing barrel 127, a plurality of fixed projecting sections 127*g* extending toward the radial direction are provided equally spaced apart from one another in the circumferential direction. In the fixed projecting sections 127*g*, through-holes functioning as holes before threading parallel to the optical axis are respectively provided in the fixed projecting sections 127*g*.

A part (the second arm sections 122*b*) of the second group holding barrel 122 and the moving barrel 128 are internally inserted on an inner side of the straight-advancing barrel 127. The moving barrel 128 includes openings in a front and a back and is formed in a substantially cylindrical shape as a whole. In a vicinity of a rear end edge portion on an inner circumferential surface of the moving barrel 128, a plurality of (in the present embodiment, three) columnar stop bosses 128*a* for integrating the moving barrel 128 with the straight-advancing barrel 127 are protrudingly provided in parallel to the optical axis direction to be respectively opposed to the fixed projecting sections 127*g* of the straight-advancing barrel 127. The plurality of (in the present embodiment, three) stop bosses 128*a* are formed at substantially equal intervals in the circumferential direction on the inner circumferential surface of the moving barrel 128.

The focus driving unit 135 is fixedly provided in a part on an inner side of the moving barrel 128. The focus driving unit 135 is a constituent unit including a driving mechanism for moving the third lens group 113, which is a focus lens group held by the third group holding barrel 123, in the direction along the optical axis O as appropriate. The focus driving unit 135 is configured by various constituent members such as a focusing lens motor 135*a*, a lead screw 135*b*, a bracket 135*c* (a motor supporting plate), and a nut 135*d*. As a basic configuration of the focus driving unit 135, a mechanism same as the mechanism generally put to practical use in the past is applied. Therefore, explanation of a detailed configuration of the focus driving unit 135 is omitted.

Further, on the inner side of the moving barrel 128, the third group holding barrel 123 that holds the third lens group 113 is disposed to be capable of moving in the direction along the optical axis O.

The first group holding barrel 121 is internally inserted and held on an inner side of a part (the second arm sections 122*b*) of the second group holding barrel 122.

The straight-advancing barrel 127 and the moving barrel 128 are integrated by stop screws 128*c* piercing through through-holes of the stop bosses 128*a* and screwing with the fixed projecting sections 127*g*. As the integration, after the straight-advancing barrel 127 is internally inserted into the cam barrel 126 and the straight-advancing barrel 127 is connected to the cam barrel 126 by the bayonet grooves 126*f* and the bayonet claws 127*a* of the bayonet mechanism, the first group holding barrel 121, the second group holding barrel 122 including the aperture unit 137, and the moving barrel 128 including the third group holding barrel 123 and the focus driving unit 135 are integrated by the stop screws 128*c* after being sequentially internally inserted into the straight-advancing barrel 127.

Figure 16:
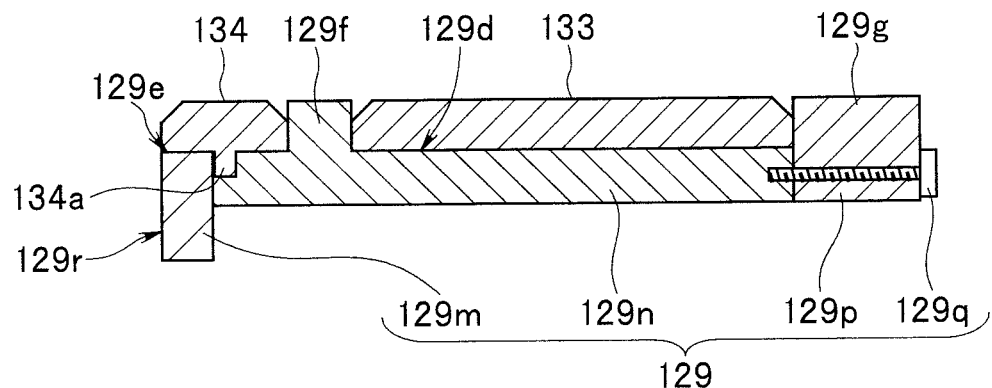
FIG. 16 is a main part enlarged sectional view mainly showing a disposition relation between an operation ring holding barrel and annular operation members (a zoom ring and a distance ring) attached to the operation ring holding barrel in the replaceable type zoom lens barrel shown in FIG. 11.
Figure 17:
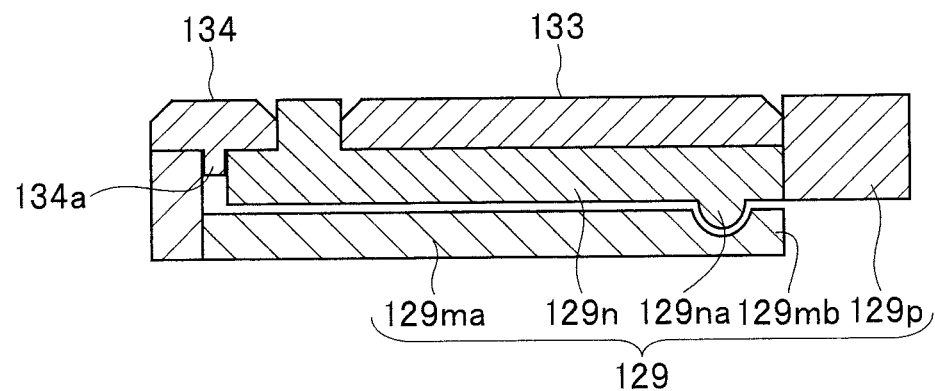
FIG. 17 is a main part enlarged sectional view showing, in particular, a coupling section of a first member and a second member of the operation ring holding barrel among components of the operation ring holding barrel and the annular operation members (the zoom ring and the distance ring) attached to the operation ring holding barrel in the replaceable type zoom lens barrel shown in FIG. 11.
Figure 18:
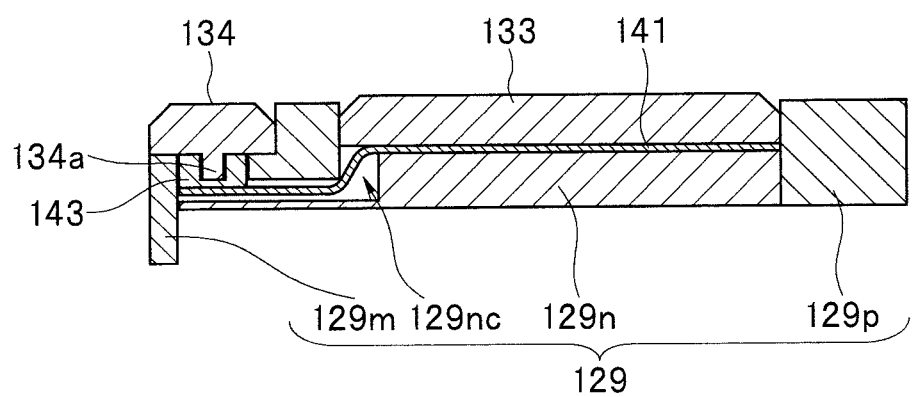
FIG. 18 is a main part enlarged sectional view showing, in particular, disposition of a flexible printed board in the operation ring holding barrel among components of the operation ring holding barrel and the annular operation members (the zoom ring and the distance ring) attached to the operation ring holding barrel in the replaceable type zoom lens barrel shown in FIG. 11.

Incidentally, as explained above, on the outer circumferential surface of the operation-ring holding barrel 129, the distance ring 134 and the zoom ring 133 are disposed to be capable of rotating around the optical axis O. Therefore, the operation-ring holding barrel 129 is configured by a structure explained below. FIG. 16 to FIG. 18 are main part enlarged sectional views showing the operation-ring holding barrel 129 in the replaceable type zoom lens barrel in the present embodiment and the annular operation members (the zoom ring and the distance ring) attached to the operation-ring holding barrel 129. Among the figures, FIG. 16 mainly shows a disposition relation between the operation-ring holding barrel and the annular operation members (the zoom ring and the distance ring). FIG. 17 particularly shows a coupling section of the first member and the second member of the operation-ring holding barrel. FIG. 18 shows disposition of the flexible printed board in the operation-ring holding barrel.

As shown in FIG. 16, the operation-ring holding barrel 129 is configured in a form in which three constituent members, that is, a first member 129m, a second member 129n, and a third member 129p, all of which are formed in a substantially annular shape, are integrated.

The first member 129m configures a front half portion of the operation-ring holding barrel 129. A part of the distance-ring holding section 129e is formed on an outer circumferential surface of the first member 129m. The second member 129n configures a main part of the operation-ring holding barrel 129. On an outer circumferential surface of the second member 129n, a part of the distance-ring holding section 129e, the rib 129f (a flange section), and the circumferential groove portion 129d in which the zoom ring 133 is disposed are formed. The third member 129p configures a rear half portion of the operation-ring holding barrel 129 and forms the outward flange section 129g. The second member 129n and the third member 129p are fixed by a plurality of screws 129q. The plurality of (in the present embodiment, three) screws 129q are disposed at substantially equal intervals in the circumferential direction on a circumferential surface on a rear end face of the third member 129p having a substantially annular shape.

Therefore, after the zoom ring 133 is fit in from a rear side of the second member 129n and mounted on an outer circumferential surface of the second member 129n, the second member 129n and the third member 129p are fastened and fixed by the screws 129q. Consequently, the zoom ring 133 is disposed to be capable of turning around the optical axis O in a state in which movement in the optical O direction is restricted in the circumferential groove portion 129d and a drop in the same direction is suppressed.

On the other hand, in the first member 129m, as shown in FIG. 17, a locking arm section 129ma extending backward in the direction along the optical axis O from a substantially annular rear end face and including a locking claw section 129mb at a distal end is formed. A plurality of (in the present embodiment, three) locking arm sections 129ma are disposed at substantially equal intervals on a circumferential surface of a rear end face of the substantially annular first member 129m. On an inner circumferential surface of the second member 129n, locked protrusions 129na are formed in parts corresponding to the respective locking claw sections 129mb. Therefore, to couple the first member 129m and the second member 129n, the first member 129m is fit in from a front surface side of the second member 129n and mounted and the respective locking claw sections 129mb are engaged with the respective locked protrusions 129na. Therefore, the respective locking arm sections 129ma are formed to have elasticity. The locking arm sections 129ma mounted from the front surface side bend with the elasticity and climb over the locked protrusions 129na. Thereafter, the locked protrusions 129na fit in recesses of the locking claw sections 129mb, whereby the first member 129m and the second member 129n are integrated.

On the other hand, as explained above, the flexible printed board 141 is extended in the circumferential direction between the outer circumferential surface (the circumferential groove portion 129d) of the operation-ring holding barrel 129 and the inner circumferential surface of the zoom ring 133. In a part of a region closer to one end of the flexible printed board 141, the main section 141a is provided in which a contact pattern (not shown in the figure) configuring a part of a zoom ring encoder that detects a rotating position of the zoom ring 133 is formed. In a predetermined part on the inner circumferential surface of the zoom ring 133 opposed to the contact pattern of the main section 141a, the contact member 142 configuring another part of the zoom ring encoder is fixedly provided. Therefore, when the replaceable type zoom lens barrel 110 is changed to the usable state during the photographing, if the zoom ring 133 is turned by manual operation of the user, the contact member 142 also turns in the same direction according to the turning and slides on the contact pattern. Consequently, the lens-side control section 151 (see FIG. 19) explained below receives a signal generated from the zoom ring encoder (141a and 142) and detects a rotating direction, a rotation amount, an operation time, and the like of the zoom ring 133.

Note that the zoom ring 133 is configured to be capable of turning within a range of a predetermined turning angle. More specifically, for example, in a normal state in which the zoom ring 133 is not operated, the zoom ring 133 is always disposed in a predetermined neutral position in a predetermined turning range. When the zoom ring 133 is turned by manual operation of the user, the zoom ring 133 turns only within the range of the predetermined turning angle according to the operation. When the manual operation of the zoom ring 133 by the user ends, that is, when the user detaches a hand from the zoom ring 133, the zoom ring 133 returns to the predetermined neutral position.

(A part of the arm section 141b, which is a part of) The flexible printed board 141 is disposed between the outer circumferential surface (the distance-ring holding section 129e) of the operation-ring holding barrel 129 and the inner circumferential surface of the distance ring 134.

More specifically, in a part of a region closer to the other end of the flexible printed board 141, a plurality of (in the present embodiment, two) arm sections 141b extending forward in the direction along the optical axis O are formed. In respective distal end parts of the plurality of arm sections 141b, position detection sensors 144 configuring a part of a distance ring encoder are respectively mounted. As the position detection sensor 144, for example, a photointerrupter (PI) is applied. As shown in FIG. 18, distal end parts of the plurality of arm sections 141b of the flexible printed board 141 are inserted through through-holes 129nc formed in a part of the second member 129n and extend onto the distance-ring holding section 129e on the outer circumferential surface of the operation-ring holding barrel 129. Consequently, the respective (two) position detection sensors 144 in the distal end parts of the plurality of arm sections 141b are disposed on the distance-ring holding section 129e of the operation-ring holding barrel 129. In a width direction substantially center portion of the inner circumferential surface of the distance ring 134 opposed to the position detection sensors 144, a streak of comb teeth 134a protrudingly provided inward are formed over a circumference in the circumferential direction. The comb teeth 134a are a part configuring another part of the distance ring encoder and act on the position detection sensors 144. Therefore, when the replaceable type zoom lens barrel 110 is changed to the usable state during the photographing, if the distance ring 134 is turned by manual operation of the user, the comb teeth 134a also turn in the same direction according to the turning and act on the position detection sensors 144. Consequently, the lens-side control section 151 (see FIG. 19) explained below receives a signal generated from the distance ring encoder (134a and 144) and detects a rotating direction, a rotation amount, an operation time, and the like of the distance ring 134.

An electric configuration of a portion related to the present invention in respective electric configurations of the replaceable type zoom lens barrel in the present embodiment and the camera main body mounted with the replaceable type zoom lens barrel is explained with reference to a block configuration diagram of FIG. 19.

Figure 19:
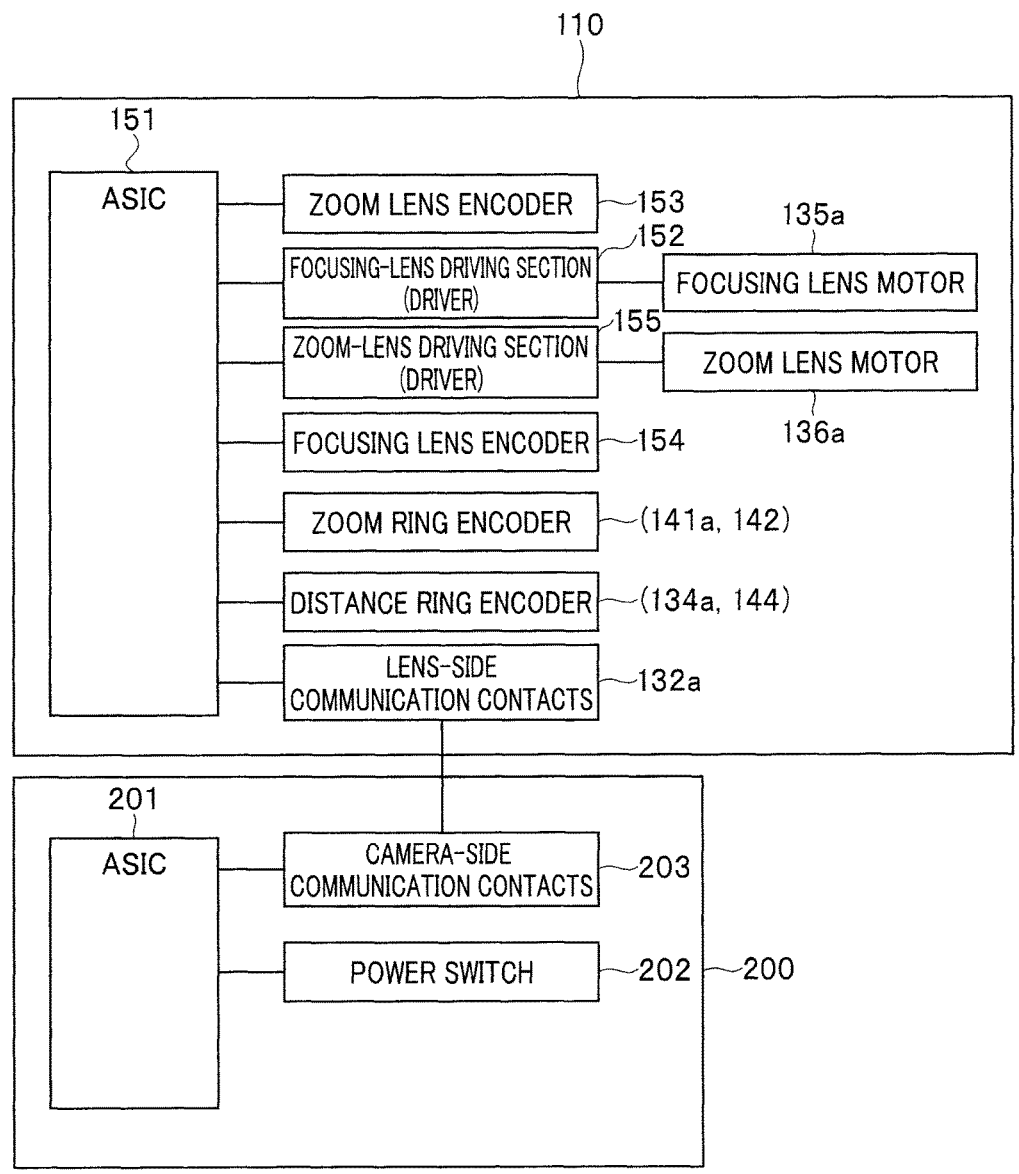
FIG. 19 is a block configuration diagram showing electric components of a portion related to the present invention among respective electric components of the replaceable type zoom lens barrel shown in FIG. 11 and a camera main body on which the replaceable type zoom lens barrel is mounted.

As shown in FIG. 19, the replaceable type zoom lens barrel 110 in the present embodiment is mounted on a camera main body 200 and used. In this case, when the replaceable type zoom lens barrel 110 is mounted on the camera main body 200, a lens-side communication contacts 132a provided in the mount ring 132 (not shown in FIG. 19) on the lens side and the camera-side communication contacts 203 provided in the mount section (not shown in the figure) on the camera main body 200 side come into contact with each other, whereby electric connection between the replaceable type zoom lens barrel 110 and the camera main body 200 is secured.

On the camera main body 200 side, a camera-side control section 201, which is a control circuit for controlling the entire camera, is provided. As the camera-side control section 201, for example, an integrated circuit called ASIC (application specific integrated circuit) is applied. Various constituent members on the camera main body 200 side are electrically connected to the camera-side control section 201. Various signals are inputted to the camera-side control section 201 from the various constituent members. Control signals to the various constituent members are outputted from the camera-side control section 201. For example, operation members such as a power switch 202 are connected to the camera-side control section 201. Instruction signals from the operation members such as the power switch 202 are inputted to the camera-side control section 201. Control signals from the camera-side control section 201 can be transmitted to the lens-side control section 151 on the lens side of the replaceable type zoom lens barrel 110 via the camera-side communication contacts 203 and the lens-side communication contacts 132a. Consequently, the camera-side control section 201 controls the replaceable type zoom lens barrel 110 in association with the lens-side control section 151.

The replaceable type zoom lens barrel 110 in the present embodiment includes, as shown in FIG. 19, electric constituent members such as the lens-side control section 151, a focusing-lens driving section (driver) 152, the focusing lens motor 135a, a zoom lens encoder 153, a focusing lens encoder 154, a zoom-lens driving section (driver) 155, the zoom lens motor 136a, the zoom ring encoder (141a and 142), the distance ring encoder (134a and 144), and the lens-side communication contacts 132a.

The lens-side control section 151 is a control circuit for controlling the replaceable type zoom lens barrel 110 in cooperation with the camera-side control section 201. As the lens-side control section 151, for example, an integrated circuit called ASIC (application specific integrated circuit) is applied.

The focusing-lens driving section (driver) 152 is a driver (a driving circuit) for receiving a control signal from the lens-side control section 151 and driving the focusing lens motor 135a included in the focus driving unit 135.

The zoom lens encoder 153 is a detection sensor that performs position detection in the optical axis O direction of movable lens groups (the first lens group 111 and the second lens group 112) contributing to zoom operation among a plurality of lens groups configuring the photographing optical system in the replaceable type zoom lens barrel 110. Note that the zoom lens encoder 153 is not particularly shown in FIG. 11 to FIG. 15.

The focusing lens encoder 154 is a detection sensor that performs position detection in the optical axis O direction of a movable lens group (the third lens group 113) contributing to focusing operation (focus operation and focus adjusting operation) among the plurality of lens groups configuring the photographing optical system in the replaceable type zoom lens barrel 110. Note that the focusing lens encoder 154 is not particularly shown in FIG. 11 to FIG. 15.

The zoom-lens driving section (driver) 155 is a driver (a driving circuit) for receiving a control signal from the lens-side control section 151 and driving the zoom lens motor 136a included in the zoom driving unit 136.

As explained above, the zoom ring encoder is a detection sensor configured by the contact pattern of the main section 141a of the flexible printed board 141 and the contact member 142 and detecting a rotating direction and a rotation amount of the zoom ring 133.

As explained above, the distance ring encoder is a detection sensor configured by the comb teeth 134a of the distance ring 134 and the position detection sensors 144 mounted on the arm sections 141b of the flexible printed board 141 and detecting a rotating direction and a rotation amount of the distance ring 134.

As explained above, the plurality of lens-side communication contacts 132a are provided in the mount ring 132 and are electric contact members for, when the replaceable type zoom lens barrel 110 is mounted on the camera main body 200, electrically connecting the replaceable type zoom lens barrel 110 and the camera main body 200.

The replaceable type zoom lens barrel 110 in the present embodiment configured in this way is mounted on the camera main body 200 corresponding thereto and used. In a state in which the replaceable type zoom lens barrel 110 and the camera main body 200 are connected, in a normal case, when the power switch 202 of the camera main body 200 is in an OFF state, that is, during the non-photographing when photographing is not performed, the replaceable type zoom lens barrel 110 is in the collapsed state shown in FIG. 13. When the replaceable type zoom lens barrel 110 is in the collapsed state during the non-photographing, the operation-ring holding barrel 129 in the replaceable type zoom lens barrel 110 is housed on the inner side of the fixed barrel 130. That is, in this state during the non-photographing, the annular operation members (the third barrel; the zoom ring 133 and the distance ring 134) are housed inside the fixed barrel 130 (the first barrel) together with the operation-ring holding barrel 129 (the second barrel). At this point, the fixed barrel 130 (the first barrel) is exposed to an exterior of the camera main body and is an armor member configuring a part of the camera main body. Note that a configuration example in the present embodiment is an example in which, in the state during the non-photographing, the annular operation members (the third barrel; the zoom ring 133 and the distance ring 134) are configured such that the entire length in the optical axis O direction thereof is housed on the inside of the fixed barrel 130 (the first barrel). The replaceable type zoom lens barrel 110 is not limited to this example. For example, a part of the zoom ring 133 (or the distance ring 134), which is the third barrel, may be housed on the inside of the fixed barrel 130 (the first barrel) during the non-photographing or another part may be exposed to the outside of the fixed barrel 130.

Figure 20:
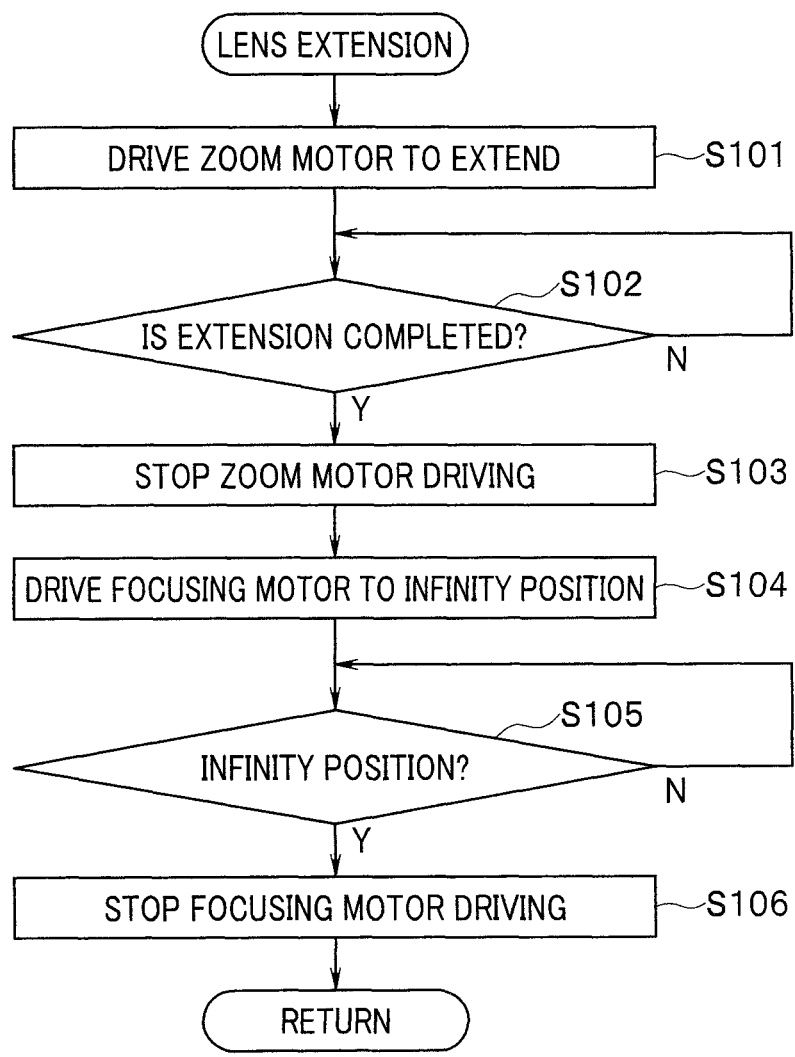
FIG. 20 is a flowchart for explaining a subroutine of lens extension processing in a control processing sequence of a camera mounted with the replaceable type zoom lens barrel shown in FIG. 11.

In this collapsed state, when the power switch 202 of the camera main body 200 is changed to an ON state by, for example, operation of the user, the camera-side control section 201 of the camera main body 200 receives an instruction signal of the operation and executes a main sequence of the camera. In an initial stage of the main sequence, lens extension processing shown in FIG. 20 is executed.

When the lens extension processing is executed, the replaceable type zoom lens barrel 110 is subjected to lens extension operation for displacing the replaceable type zoom lens barrel 110 from the collapsed state shown in FIG. 13 to a photographable state, for example, a position of one of the wide state shown in FIG. 11 and the telephoto state shown in FIG. 12. When the replaceable type zoom lens barrel 110 changes to the photographable state (the state during the photographing), the operation-ring holding barrel 129 (the second barrel) is extended forward from the inner side of the fixed barrel 130 together with the annular operation members (the third barrel; the zoom ring 133 and the distance ring 134). The annular operation members (the third barrel; the zoom ring 133 and the distance ring 134) disposed on the outer circumferential surface of the operation-ring holding barrel 129 are exposed to the outside. In this state, the annular operation members (the third barrel; the zoom ring 133 and the distance ring 134) can be, for example, manually rotated around the optical axis O to drive a lens (photographing optical system) in the replaceable type zoom lens barrel 110 in the direction along the optical axis O.

An overview of action of the replaceable type zoom lens barrel 110 in the present embodiment is explained. First, when the replaceable type zoom lens barrel 110 is in the collapsed state, the power switch 202 of the camera main body 200 is changed to the ON state by, for example, operation of the user, whereby the camera is started and the lens extension processing is performed.

When the camera is started by the power-on operation, the camera-side control section 201 drives the zoom lens motor 136a of the zoom driving unit 136 via the zoom-lens driving section 155 in cooperation with the lens-side control section 151. When the zoom lens motor 136a is driven to rotate, a driving force of the zoom lens motor 136a is transmitted to the rotating barrel 131 via the zoom driving unit 136. That is, the long gear 136c of the zoom driving unit 136 rotates, whereby the rotating barrel 131 rotates via the sector gear 131e that meshes with the long gear 136c. Since the cam pins 131a of the rotating barrel 131 are cam-connected to the cam grooves 130b of the fixed barrel 130, the rotating barrel 131 is extended forward to a predetermined position while rotating.

At the same time, since one of the cam pins 126a engages with the open groove section 131c of the fork-like arm section 131b of the rotating barrel 131, when the rotating barrel 131 rotates, a rotation driving force of the rotating barrel 131 rotates the cam barrel 126 in the same direction. Since the cam pins 126a of the cam barrel 126 are cam-connected to the cam grooves 129a of the operation-ring holding barrel 129, when the cam barrel 126 rotates, a rotation driving force of the cam barrel 126 is transmitted to the operation-ring holding barrel 129. However, since the straight-advancing keys 129h of the operation-ring holding barrel 129 engage with the straight-advancing grooves 130a of the fixed barrel 130, the operation-ring holding barrel 129 is restricted from rotating. Therefore, the operation-ring holding barrel 129 receives the rotation driving force of the cam barrel 126 and is extended forward to a predetermined position while being restricted from rotating.

The first cam grooves 126c of the cam barrel 126 and the cam pins 121a of the first group holding barrel 121 are cam-connected. At this point, since the cam pins 121a engage with the first straight-advancing grooves 127c of the straight-advancing barrel 127, the first group holding barrel 121 is restricted from rotating. Therefore, when the cam barrel 126 rotates, the first group holding barrel 121 is extended forward to a predetermined position while being restricted from rotating.

In this way, the replaceable type zoom lens barrel 110 in the collapsed state (FIG. 13) changes to a (photographable) predetermined state during the photographing, for example, a position of one of the wide state (FIG. 11) and the telephoto state (FIG. 12), that is, a state of any one of zoom end positions that can be set.

In this state, when the user performs rotation operation of the zoom ring 133, a signal from the zoom ring encoder (141a and 142) is transmitted to the camera-side control section 201 via the lens-side control section 151. The camera-side control section 201 receives the signal, drives the zoom lens motor 136a of the zoom driving unit 136 via the zoom-lens driving section 155 in cooperation with the lens-side control section 151, and executes zoom driving control (zooming control) corresponding to the operation.

In this case, a driving force of the zoom lens motor 136a rotates the rotating barrel 131. A rotation driving force of the rotating barrel 131 rotates the cam barrel 126. The second cam grooves 126d of the cam barrel 126 and the cam pins 122a of the second group holding barrel 122 are cam-connected. Since the cam pins 122a engage with the second straight-advancing grooves 127d of the straight-advancing barrel 127, the second group holding barrel 122 is restricted from rotating. Therefore, when the cam barrel 126 rotates, the second group holding barrel 122 moves to advance and retract by a predetermined amount corresponding to the operation of the zoom ring 133 in the direction along the optical axis O while being restricted from rotating. At the same time, when the cam barrel 126 rotates, as explained above, with the same configuration, the first group holding barrel 121 also moves to advance and retract by a predetermined amount corresponding to the operation of the zoom ring 133 in the direction along the optical axis O while being restricted from rotating. Consequently, the first lens group 111 and the second lens group 112 are disposed in predetermined positions on the optical axis O and zoom driving corresponding to the operation is executed.

At the same time, the third group holding barrel 123 that holds the third lens group 113, which is the focusing lens group, is also driven in the same manner as action of a mechanism explained below according to zoom operation from the position in the telephoto state or the wide state.

When the user performs rotation operation of the distance ring 134, a signal from the distance ring encoder (134a and 144) is transmitted to the camera-side control section 201 via the lens-side control section 151. The camera-side control section 201 receives the signal, drives the focusing lens motor 135a of the focus driving unit 135 via the focusing-lens driving section 152 in cooperation with the lens-side control section 151, and executes focusing driving control (focusing control) corresponding to the operation.

Note that, in this case, the focusing driving control is generally action explained below. That is, when the focusing lens motor 135a is driven, the lead screw 135b rotates. Then, the nut 135d screwed with the lead screw 135b moves to advance and retract on an axis of the lead screw 135b. Consequently, the third group holding barrel 123 disposed in contact with the nut 135d moves to advance and retract by a predetermined amount corresponding to the operation in the direction along the optical axis O. Consequently, since a focusing state changes, the user performs focus adjustment while observing a display device, a finder device, or the like (not shown in the figure) provided in the camera main body 200. In this way, the manual focus adjustment operation performed by the user manually operating the distance ring 134 is executed.

A lens extension processing sequence during a start of the camera mounted with the replaceable type zoom lens barrel in the present embodiment is explained with reference to FIG. 20. Note that, concerning details of a main sequence of the camera, explanation is omitted assuming that the main sequence is substantially the same as a main sequence of a general camera in the past.

As explained above, when the replaceable type zoom lens barrel 110 is in the collapsed state, when the power switch 202 of the camera main body 200 is changed to the ON state by, for example, the operation of the user, the main sequence of the camera is executed and lens extension processing shown in FIG. 20 is started.

First, in step S101 in FIG. 20, the camera-side control section 201 controls to drive the zoom lens motor 136a via the zoom-lens driving section 155 in cooperation with the lens-side control section 151 and executes zoom motor extension driving processing. The zoom motor extension driving processing is processing for displacing, using a driving force of the zoom lens motor 136a, the photographing optical system of the replaceable type zoom lens barrel 110 in the collapsed state to the photographable state during the photographing (e.g., the wide state or the telephoto state, that is, a state in which the photographing optical system is set to an end point of one of regions in which zoom is possible).

Subsequently, in step S102, the camera-side control section 201 checks a lens position detected on the basis of an output from the zoom lens encoder 153 or the like and checks whether or not predetermined extension driving processing is completed. When the extension completion is confirmed, the camera-side control section 201 proceeds to processing in next step S103.

In step S103, the camera-side control section 201 controls the zoom lens motor 136a to stop the driving of the zoom lens motor 136a.

Subsequently, in step S104, the camera-side control section 201 controls to drive the focusing lens motor 135a via the focusing-lens driving section 152 in cooperation with the lens-side control section 151 and executes focusing motor driving processing for moving the focusing motor to a predetermined infinity position.

In step S105, the camera-side control section 201 checks a position on the optical axis O of the focusing lens group (the third lens group 113, which is the focus lens group) detected on the basis of an output from the focusing lens encoder 154 or the like and checks whether or not the focusing lens group is disposed in a predetermined infinity position (a predetermined position where focusing adjustment is performed to infinity). When the infinity position of the focusing lens group is confirmed, the camera-side control section 201 proceeds to processing in next step S106.

In step S106, the camera-side control section 201 controls the focusing lens motor 135a to stop the driving of the focusing lens motor 135a. Thereafter, the camera-side control section 201 ends a series of processing and returns to original processing sequence (e.g., a not-shown main sequence).

Note that, in step S105, the focusing lens group (the third lens group 113) is set in the infinity position. However, not only this, but the focusing lens group may be set in a close position or may be set to be focused on an object at a specific distance, for example, a distance of 3 m.

In this subroutine, after the first lens group 111 and the second lens group 112 are extended first, the third lens group 113, which is the focusing lens group, is extended. However, not only this, but the first and second lens groups 111 and 112 and the third lens group 113 may be alternately extended. This applies during retraction explained below.

Figure 21:
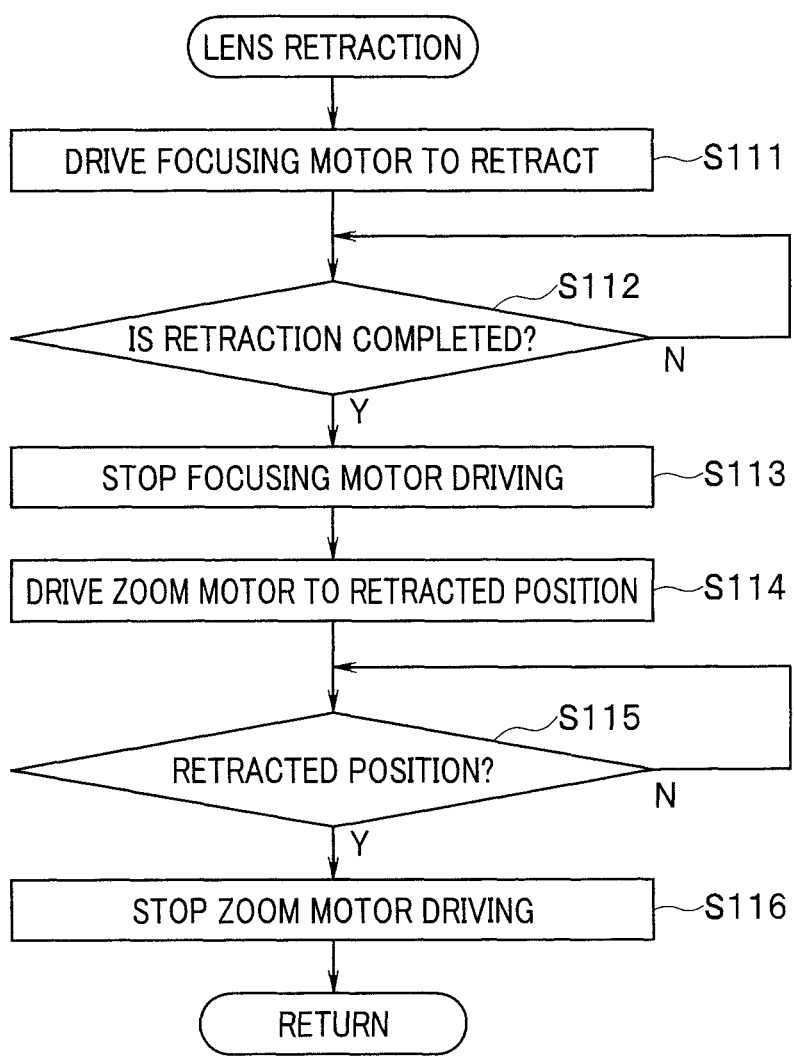
FIG. 21 is a flowchart for explaining a subroutine of lens retraction processing in the control processing sequence of the camera mounted with the replaceable type zoom lens barrel shown in FIG. 11.

On the other hand, when the replaceable type zoom lens barrel 110 is in the state during the photographing, that is, in a state in which the photographing optical system is set in any position between the wide state shown in FIG. 11 and the telephoto state shown in FIG. 12, if the power switch 202 of the camera main body 200 is changed to the OFF state by, for example, operation of the user, the camera-side control section 201 of the camera main body 200 starts lens retraction processing shown in FIG. 21. A lens retraction processing sequence during power-off of the camera mounted with the replaceable type zoom lens barrel in the present embodiment is explained with reference to FIG. 21.

As explained above, during the use of the camera (during the photographing), when the power switch 202 of the camera main body 200 is changed to the OFF state by, for example, operation of the user, the lens retraction processing shown in FIG. 21 is started.

First, in step S111 of FIG. 21, the camera-side control section 201 controls to drive the focusing lens motor 135a via the focusing-lens driving section 152 in cooperation with the lens-side control section 151 and executes focusing motor driving processing for moving the focusing motor to a predetermined retracted position.

In step S112, the camera-side control section 201 checks a position on the optical axis O of the focusing lens group (the third lens group 113, which is the focus lens group) detected on the basis of an output from the focusing lens encoder 154 or the like and checks whether or not predetermined retraction driving processing is completed. When the retraction completion is confirmed, the camera-side control section 201 proceeds to processing in next step S113.

In step S113, the camera-side control section 201 controls the focusing lens motor 135a to stop the driving of the focusing lens motor 135a.

Subsequently, in step S114, the camera-side control section 201 controls to drive the zoom lens motor 136a via the zoom-lens driving section 155 in cooperation with the lens-side control section 151 and executes zoom motor retraction driving processing. The zoom motor retraction driving processing is processing for performing retraction operation of the respective lens groups using a driving force of the zoom lens motor 136a and finally displacing the lens groups to the collapsed state.

In step S115, the camera-side control section 201 checks a lens position detected on the basis of an output from the zoom lens encoder 153 or the like and checks whether or not the lens groups are disposed in a predetermined retracted position. When movement to the predetermined retracted position is confirmed, the camera-side control section 201 proceeds to processing in next step S116.

In step S116, the camera-side control section 201 controls the zoom lens motor 136a to stop the driving of the zoom lens motor 136a. Thereafter, the camera-side control section 201 ends a series of processing and returns to original processing sequence (e.g., a not-shown main sequence).

As explained above, according to the second embodiment, the replaceable type zoom lens barrel 110 that changes to the more retracted state during the non-photographing than during the photographing and changes to the more extended state during the photographing than during the non-photographing includes the fixed barrel 130 (the first barrel), the operation-ring holding barrel 129 (the second barrel) capable of advancing and retracting in the optical axis O direction with respect to the fixed barrel 130, and the zoom ring 133 or the distance ring 134 (the third barrel) capable of moving in the optical axis O direction together with the operation-ring holding barrel 129, housed in the fixed barrel 130 during the non-photographing, exposed from the fixed barrel 130 during the photographing, and capable of manually rotating around the optical axis O in order to drive the movable lens groups disposed on the inside of the replaceable type zoom lens barrel 110 in the optical axis O direction.

With such a configuration, in the replaceable type zoom lens barrel 110 in the second embodiment, when the replaceable type zoom lens barrel 110 is changed to the non-photographing state (the collapsed state), the entire length in the optical axis O direction of one of the zoom ring 133 and the distance ring 134 capable of rotating (the third barrel) or both of the zoom ring 133 (the third barrel) and the distance ring 134 (the fourth barrel) are housed in the fixed barrel 130. The fixed barrel 130 is exposed to the outside. Therefore, when the replaceable type zoom lens barrel 110 is attached to and detached from the camera main body, the user only has to perform operation for gripping the outer circumferential surface of the fixed barrel 130 and rotating the fixed barrel 130. At this point, the fixed barrel 130 is always gripped and the attaching and detaching operation is performed. Therefore, it is possible to always quickly perform sure attaching and detaching operation without exterior annular components unnecessarily rotating.

Note that, in the zoom lens barrel of the present invention, in the non-photographing state, a front end face 130$d$ of the fixed barrel 130, a front end face 134$c$ of the distance ring 134, a front end face 129$r$ of the operation-ring holding barrel 129, a front end face 126$h$ of the cam barrel 126, and a front end face 121$c$ of the first group holding barrel 121 are in substantially the same positions in the optical axis direction. However, these end faces do not always need to be present in the same position. During the collapsing (the non-photographing state), all of the end faces may be present in positions shifted with respect to a position of the front end face 130$d$ of the fixed barrel 130. In conjunction with these configurations, in particular, at least a part of the outer circumferential surface of the distance ring 134 is present on the inner circumferential surface of the fixed barrel 130, whereby it is possible to attain a further reduction in length than the collapsible lens barrel in the past. In the lens barrel of the present invention, the first annular member and the second annular member are arranged in the optical axis direction. In the photographable state, an entire outer circumference exterior section of the first annular member is exposed in the optical axis direction. A cam stroke is formed as appropriate, whereby at least a part of an exterior outer circumference of the second annular member is exposed to the outside. In the un-photographable state, an entire length in the optical axis direction of the outer circumference exterior section of the second annular member can be housed in the fixed barrel.

In the lens barrel of the present invention, a cam stroke is formed as appropriate in the non-photographing state, whereby an end face forward in the optical axis direction of at least one of the first annular member and the second annular member can be located further backward in the optical axis direction than the end face forward in the optical axis direction of the fixed barrel.

The lens barrel of the present invention may be considered that the lens barrel further includes a second annular member, the first annular member and the second annular member are arranged in the optical axis direction, in the photographable state, an entire exterior outer circumference of the first annular member and an entire exterior outer circumference of the second annular member are exposed to the outside, and, in the un-photographable state, the entire exterior outer circumference of the first annular member and the entire exterior outer circumference of the second annular member are housed in the fixed barrel.

The present invention is not limited to the embodiments explained above. It goes without saying that various modifications and applications can be carried out within a range not departing from the spirit of the invention. Further, the embodiments include inventions in various stages. Various inventions can be extracted according to appropriate combinations in the disclosed plurality of constituent elements. For example, even if several constituent elements are deleted from all the constituent elements disclosed in the one embodiment, when the problems to be solved by the invention can be solved and the effects of the invention can be obtained, a configuration from which the constituent element is deleted can be extracted as an invention.

What is claimed is:

1. A changeable lens barrel comprising:
a fixed barrel formed in an annular shape and having length in an optical axis direction;
a straight-advancing barrel relatively moving in the optical axis direction with respect to the annular fixed barrel and housed in the fixed barrel in a non-photographing state and extended to an outside of the fixed barrel in a photographing state; and
a first annular member placed in the straight-advancing barrel, having length in the optical axis direction, and made of an annular member that turns around the optical axis according to manual operation, wherein
when the changeable lens barrel is in a photographable state, at least a part of an outer circumference of an exterior of the first annular member is exposed to an outside and a front end face of the annular member forward in an optical axis direction is located further forward than a front end face of the fixed barrel forward in the optical axis direction, and, when the changeable lens barrel is in an un-photographable state in which the changeable lens barrel is further retracted in the optical axis direction than in the photographing state, a rear end face backward in the optical axis direction is within the fixed barrel and the rear end face is present further backward in the optical axis direction than when the changeable lens barrel is in the photographable state.

2. The changeable lens barrel according to claim 1, further comprising a second annular member, wherein
the first annular member and the second annular member are arranged in the optical axis direction,
in the photographable state, an entire outer circumference exterior section of the first annular member is exposed in the optical axis direction, and at least a part of an exterior outer circumference of the second annular member is exposed to an outside, and
in the un-photographable state, an entire length in the optical axis direction of an outer circumference exterior section of the second annular member is housed in the fixed barrel.

3. The changeable lens barrel according to claim 2, wherein, in the non-photographing state, an end face forward in the optical axis direction of at least one of the first annular member and the second annular member is located further backward in the optical axis direction than an end face forward in the optical axis direction of the fixed barrel.

4. The changeable lens barrel according to claim 3, wherein
the changeable lens barrel is a zoom lens barrel, the first annular member is a focus ring, and
the second annular member is a zoom ring.

5. The changeable lens barrel according to claim 1, further comprising a second annular member, wherein
the first annular member and the second annular member are arranged in the optical axis direction,
in the photographable state, an entire exterior outer circumference of the first annular member and an entire exterior outer circumference of the second annular member are exposed to an outside, and
in the un-photographable state, the entire exterior outer circumference of the first annular member and the entire exterior outer circumference of the second annular member are housed in the fixed barrel.

6. The changeable lens barrel according to claim 5, wherein
the changeable lens barrel is a zoom lens barrel,
the first annular member is a focus ring, and
the second annular member is a zoom ring.

7. The changeable lens barrel according to claim 1, wherein the changeable lens barrel further includes a second annular member in the fixed barrel.

8. The changeable lens barrel according to claim 7, wherein, during the un-photographable time, the first and second annular members are disposed in a radial direction.

9. The changeable lens barrel according to claim 8, wherein
the changeable lens barrel is a zoom lens barrel,
the first annular member is a focus ring and the second annular member is a zoom ring, and
in the photographable state, an entire exterior is exposed in the optical axis direction and, in the un-photographable state, an entire length in the optical axis direction of an exterior section of an outer circumference is housed in the fixed barrel.

10. The changeable lens barrel according to claim 1, wherein the fixed barrel is disposed in an outermost circumference.

11. The changeable lens barrel according to claim 10, further comprising a second annular member, wherein
the first annular member and the second annular member are arranged in the optical axis direction,
in the photographable state, an entire outer circumference exterior section of the first annular member is exposed in the optical axis direction, and at least a part of an exterior outer circumference of the second annular member is exposed to an outside, and
in the un-photographable state, an entire length in the optical axis direction of an outer circumference exterior section of the second annular member is housed in the fixed barrel.

12. The changeable lens barrel according to claim 11, wherein
the changeable lens barrel is a zoom lens barrel,
the changeable lens barrel further includes a second annular member, and
the first annular member is a focus ring and the second annular member is a zoom ring.

13. The changeable lens barrel according to claim 10, further comprising a second annular member, wherein
the first annular member and the second annular member are arranged in the optical axis direction,
in the photographable state, an entire exterior outer circumference of the first annular member and an entire exterior outer circumference of the second annular member are exposed to an outside, and
in the un-photographable state, the entire exterior outer circumference of the first annular member and the entire exterior outer circumference of the second annular member are housed in the fixed barrel.

14. The changeable lens barrel according to claim 13, wherein
the changeable lens barrel is a zoom lens barrel,
the changeable lens barrel further includes a second annular member, and
the first annular member is a focus ring and the second annular member is a zoom ring.

15. The changeable lens barrel according to claim 1, further comprising:
driving means for driving, in the optical axis direction, at least one lens group among a plurality of lens groups in the changeable lens barrel;
an encoder device that encodes turning of the first annular member; and
control means for driving the driving means to drive the one lens group in the optical axis direction on the basis of an output of the encoder device that encodes the turning of the first annular member.

16. The changeable lens barrel according to claim 15, wherein the driving means includes an electric driving source that drives, in the optical axis direction, a holding barrel that holds the one lens group, and the first annular member is a focus ring.

* * * * *